US012623583B2

(12) United States Patent     (10) Patent No.:   US 12,623,583 B2
Kimoto et al.                (45) Date of Patent:     May 12, 2026

(54) VEHICLE

(71) Applicant: KAWASAKI MOTORS, LTD., Hyogo (JP)

(72) Inventors: Shingo Kimoto, Akashi (JP); Teruaki Yamamoto, Akashi (JP); Shigeaki Uematsu, Akashi (JP); Yoshitsugu Shibasaki, Akashi (JP); Akihiro Ishii, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 369 days.

(21) Appl. No.: 18/417,610

(22) Filed: Jan. 19, 2024

(65) Prior Publication Data

US 2025/0236231 A1     Jul. 24, 2025

(51) Int. Cl.
    B60P 1/28          (2006.01)
    B62D 33/037       (2006.01)

(52) U.S. Cl.
    CPC ..................................... B60P 1/286 (2013.01)

(58) Field of Classification Search
    CPC ............................... B60P 1/286; B62D 33/037
    See application file for complete search history.

(56) References Cited

U.S. PATENT DOCUMENTS

| | | |
|---|---|---|
| 2007/0216195 A1 | 9/2007 | Furman |
| 2016/0185270 A1* | 6/2016 | Takahashi ................. B60P 1/16 298/17 R |
| 2024/0158023 A1* | 5/2024 | Ishii ................... B62D 33/0273 |
| 2024/0253713 A1* | 8/2024 | Reedy ................... B62D 33/02 |

\* cited by examiner

*Primary Examiner* — Dany E Akakpo
(74) *Attorney, Agent, or Firm* — Studebaker Brackett PLLC

(57)          ABSTRACT

A utility vehicle 100 is a vehicle, and includes a base 1, a cargo bed 2, a lift spring 3, and a lock 4. The lift spring 3 is located offset to one side with respect to the center of the cargo bed 2 in a vehicle width direction. The lock 4 includes a first lock 4A and a second lock 4B. The first lock 4A has a first striker 5A, a first hook 6A, and a lock spring 7. The second lock 4B has a second striker 5B and a second hook 6B. The second hook 6B is coupled to the first hook 6A so as to rotate integrally with the first hook 6A. When the cargo bed 2 transitions from a lifted state to a lowered state, the first hook 6A rotates in a reverse direction of a biasing direction against the elastic force of the lock spring 7 by contacting the first striker 5A, and thereafter, rotates in a forward direction which is the biasing direction by the elastic force of the lock spring 7 and is engaged with the first striker 5A. The second hook 6B rotates without contacting the second striker 5B by rotation of the first hook 6A in the reverse direction, and thereafter, rotates by rotation of the first hook 6A in the forward direction and is engaged with the second striker 5B.

10 Claims, 15 Drawing Sheets

FRONT

REAR

RIGHT-LEFT
DIRECTION

UP-DOWN
DIRECTION

VEHICLE

FIELD

The technique disclosed here relates to a vehicle.

BACKGROUND

U.S. Patent Application Publication No. 2007/0216195 discloses a utility vehicle including a base, a cargo bed, and a lift spring. The cargo bed is rotatably attached to the base so as to mutually transition between a lowered state and a lifted state. One end of the lift spring is attached to the bottom of the cargo bed, and the other end of the lift spring is attached to the base. A rotatable rod extending in a vehicle width direction is attached to the bottom of the cargo bed. Two hooks located right and left are attached to the rod. When the cargo bed is in the lowered state, the two hooks are engaged with the base.

SUMMARY

In some cases, the lift spring is located offset to one side with respect to the center of the cargo bed in the vehicle width direction. In this case, when a user pushes down the cargo bed from the lifted state to the lowered state, the cargo bed may tilt right and left due to biasing of the lift spring. As a result, one hook cannot be engaged with the base, and the cargo bed may be insufficiently locked to the base.

The technique disclosed here has been made in view of the above-described points, and an object thereof is to reduce a probability of the cargo bed being insufficiently locked to the base.

A vehicle disclosed here is a vehicle including a base, a cargo bed attached to the base so as to rotate about a predetermined cargo bed axis extending in a vehicle width direction between a lowered state in which the cargo bed is mounted on the base and a lifted state in which the cargo bed is lifted from the base, a lift spring biasing the cargo bed from the lowered state to the lifted state, and a lock fixing the cargo bed in the lowered state on the base. The lift spring is located offset to one side with respect to the center of the cargo bed in the vehicle width direction. The lock includes a first lock located offset to the same side as the lift spring with respect to the center of the cargo bed in the vehicle width direction and a second lock located offset to a side opposite to the lift spring with respect to the center of the cargo bed in the vehicle width direction. The first lock has a first striker attached to one of the cargo bed or the base, a first hook attached to the other one of the cargo bed or the base so as to rotate about a predetermined lock axis and engaged with the first striker when the cargo bed is in the lowered state, and a lock spring biasing the first hook about the lock axis in a biasing direction of the first hook being engaged with the first striker. The second lock has a second striker attached to the cargo bed or the base to which the first striker is attached, and a second hook attached to the cargo bed or the base to which the first hook is attached so as to rotate about the lock axis and engaged with the second striker when the cargo bed is in the lowered state. The second hook is coupled to the first hook so as to rotate integrally with the first hook. When the cargo bed transitions from the lifted state to the lowered state, the first hook rotates in a reverse direction of the biasing direction against the elastic force of the lock spring by contacting the first striker, and thereafter, rotates in a forward direction which is the biasing direction by the elastic force of the lock spring and is engaged with the first striker; and the second hook rotates without contacting the second striker by rotation of the first hook in the reverse direction, and thereafter, rotates by rotation of the first hook in the forward direction and is engaged with the second striker.

A vehicle of another aspect disclosed here is a vehicle including a base, a cargo bed attached to the base so as to rotate about a predetermined cargo bed axis extending in a vehicle width direction between a lowered state in which the cargo bed is mounted on the base and a lifted state in which the cargo bed is lifted from the base, a lift spring biasing the cargo bed from the lowered state to the lifted state, and a lock fixing the cargo bed in the lowered state on the base. The lift spring is located offset to one side with respect to the center of the cargo bed in the vehicle width direction. The lock includes a first lock located offset to the same side as the lift spring with respect to the center of the cargo bed in the vehicle width direction and a second lock located offset to a side opposite to the lift spring with respect to the center of the cargo bed in the vehicle width direction. The first lock has a first striker attached to one of the cargo bed or the base, a first hook attached to the other one of the cargo bed or the base so as to rotate about a predetermined lock axis and engaged with the first striker when the cargo bed is in the lowered state, and a lock spring biasing the first hook about the lock axis in a biasing direction of the first hook being engaged with the first striker. The second lock has a second striker attached to the cargo bed or the base to which the first striker is attached, and a second hook attached to the cargo bed or the base to which the first hook is attached so as to rotate about the lock axis and engaged with the second striker when the cargo bed is in the lowered state. The second hook is coupled to the first hook so as to rotate integrally with the first hook. The first hook has a body extending substantially parallel with a radial direction about the lock axis and a bent portion bent from the body. The first striker has a striker engagement surface with which the bent portion contacts in the lowered state and a curved surface guiding the first hook to the striker engagement surface.

The vehicle is configured so that a probability of the cargo bed being insufficiently locked to the base can be reduced.

DESCRIPTION OF EMBODIMENTS

Figure 1:
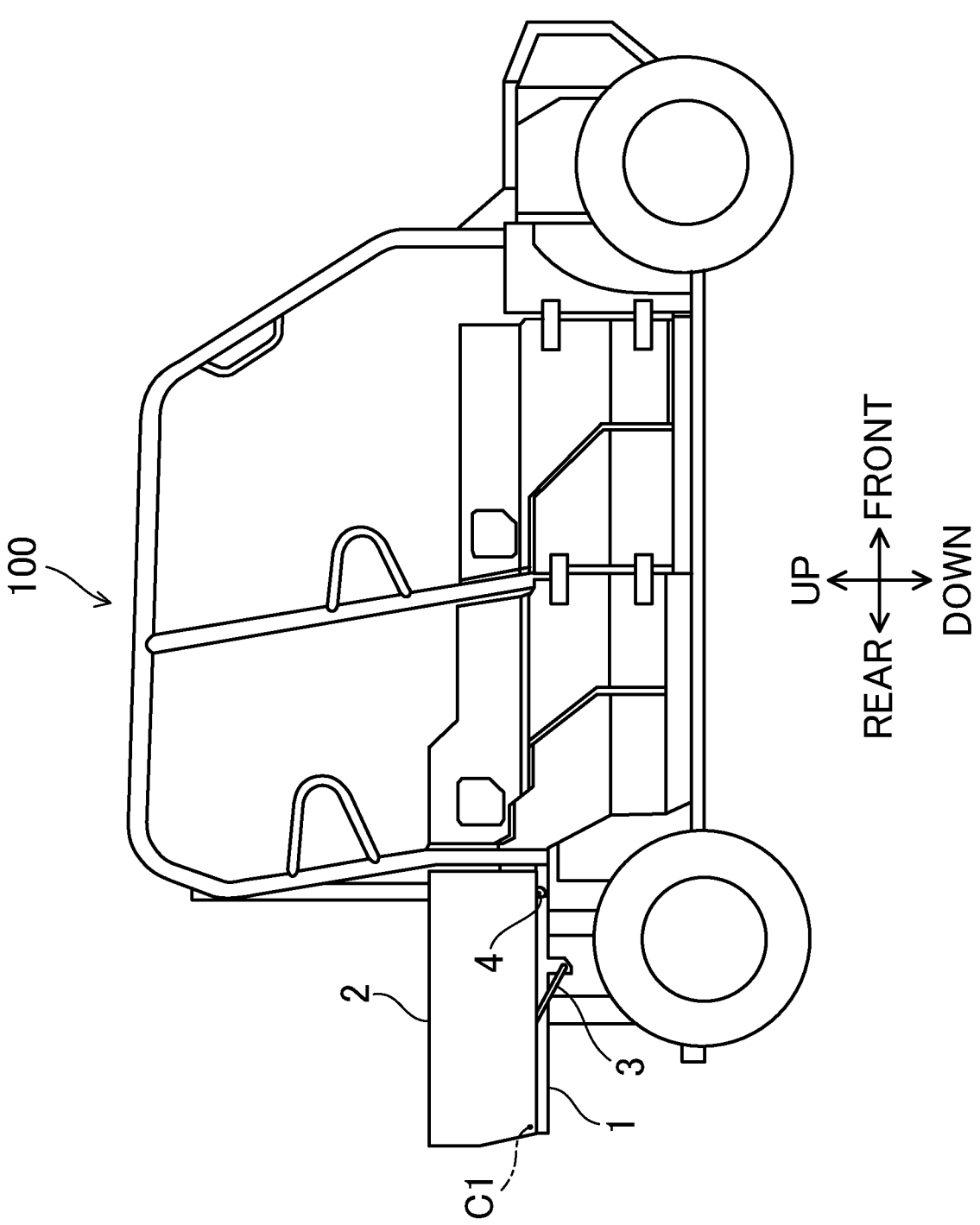
FIG. 1 is a side view of a utility vehicle.

Hereinafter, an exemplary embodiment will be described based on the drawings. FIG. 1 is a side view of a utility vehicle 100.

The utility vehicle 100 is a four-wheeled vehicle which can travel off road. Specifically, the utility vehicle 100 is an off-road vehicle. The utility vehicle 100 is one example of a vehicle. Hereinafter, the utility vehicle 100 will also be merely referred to as a "vehicle 100." The vehicle 100 includes a base 1, a cargo bed 2 attached to the base 1, a lift spring 3 biasing the cargo bed 2 upward, and a lock 4 fixing the cargo bed 2.

In the present disclosure, each component of the vehicle 100 will be described using a direction with respect to the vehicle 100. Specifically, a "front" means the front of the vehicle 100 in a vehicle front-rear direction, and a "rear" means the rear of the vehicle 100 in the vehicle front-rear direction. A "left" means the left when facing the front of the vehicle 100, and a "right" means the right when facing the front of the vehicle 100. Note that a right-left direction will also be referred to as a "vehicle width direction." In the present disclosure, a member extending or expanding in a certain direction includes not only a member precisely extending or expanding parallel with a certain direction, but also a member substantially extending or expanding in a certain direction.

Figure 2:
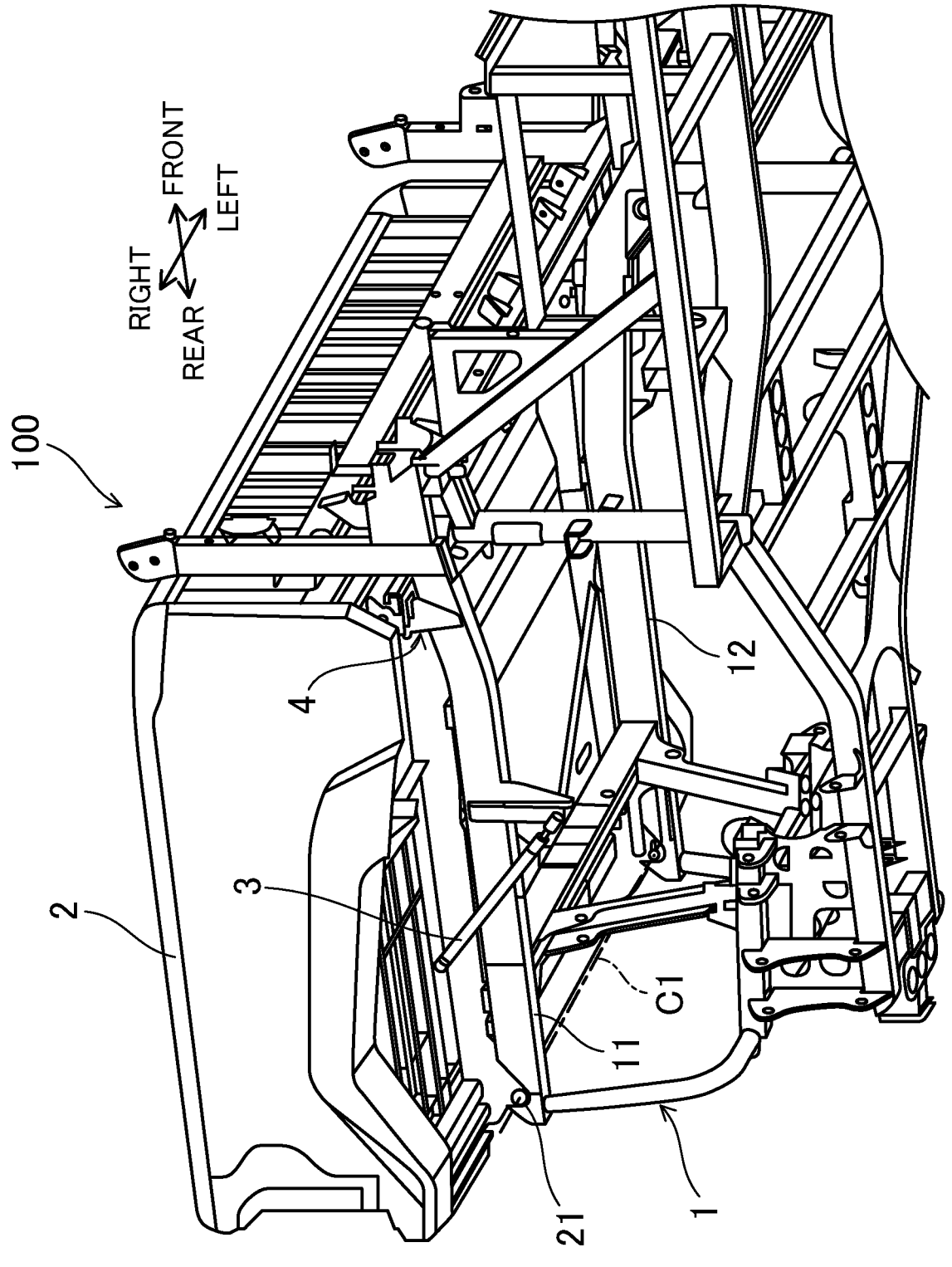
FIG. 2 is a perspective view of a rear portion of the utility vehicle diagonally from below.

FIG. 2 is a perspective view of a rear portion of the vehicle 100 diagonally from below. The base 1 supports the cargo bed 2. The base 1 is located in rear of a cabin at a vehicle body of the vehicle 100. The base 1 includes a first longitudinal frame 11 and a second longitudinal frame 12. Each of the first longitudinal frame 11 and the second longitudinal frame 12 extends in the front-rear direction. The first longitudinal frame 11 is located on the right side with respect to the center of the vehicle body in the vehicle width direction, and the second longitudinal frame 12 is located on the left side with respect to the center of the vehicle body in the vehicle width direction.

Figure 3:
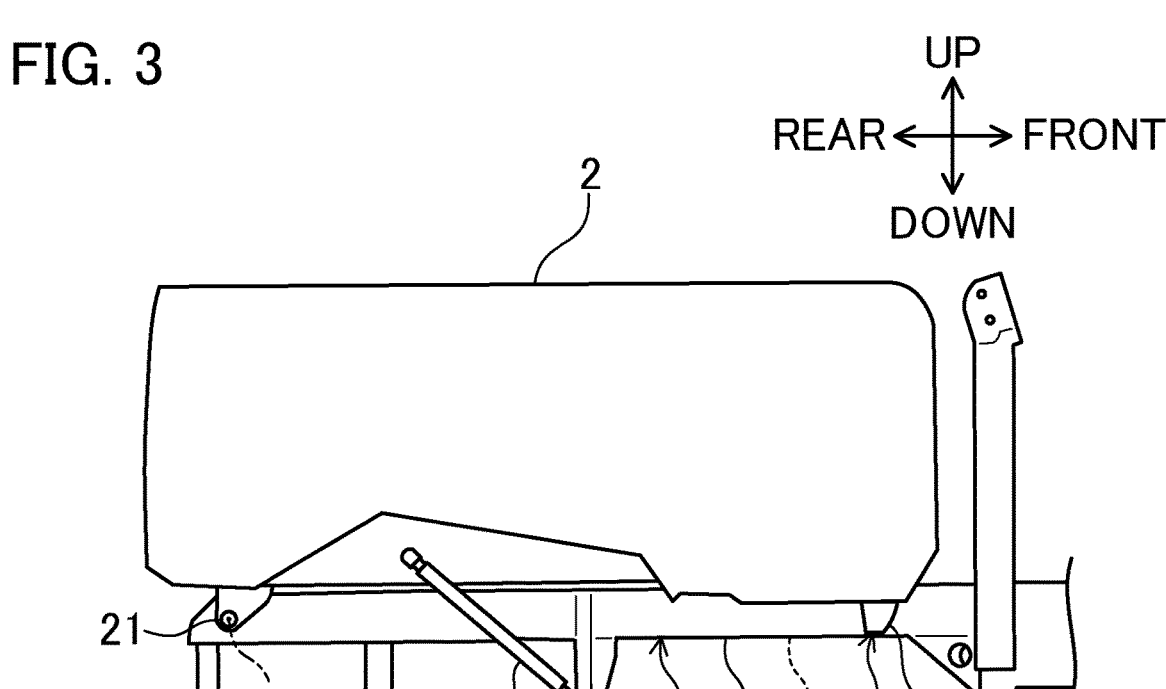
FIG. 3 is a side view for describing a cargo bed in a lowered state.
Figure 4:
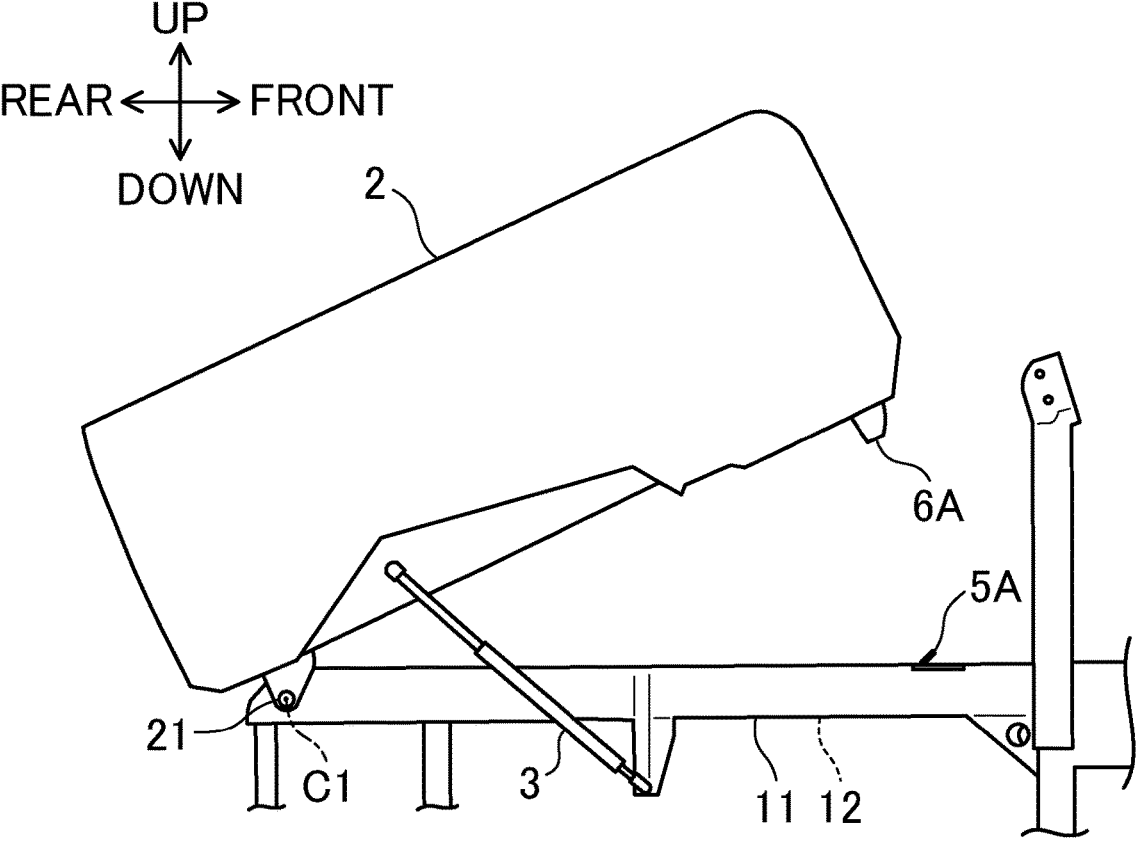
FIG. 4 is a side view for describing the cargo bed in a lifted state.

FIG. 3 is a side view for describing the cargo bed 2 in a lowered state. FIG. 4 is a side view for describing the cargo bed 2 in a lifted state. The cargo bed 2 is rotatable about a predetermined cargo bed axis C1 extending in the vehicle width direction between the lowered state in which the cargo bed 2 is mounted on the base 1 as shown in FIG. 3 and the lifted state in which the cargo bed 2 is lifted from the base 1 as shown in FIG. 4. That is, the cargo bed 2 mutually transitions between the lowered state and the lifted state.

Figure 5:
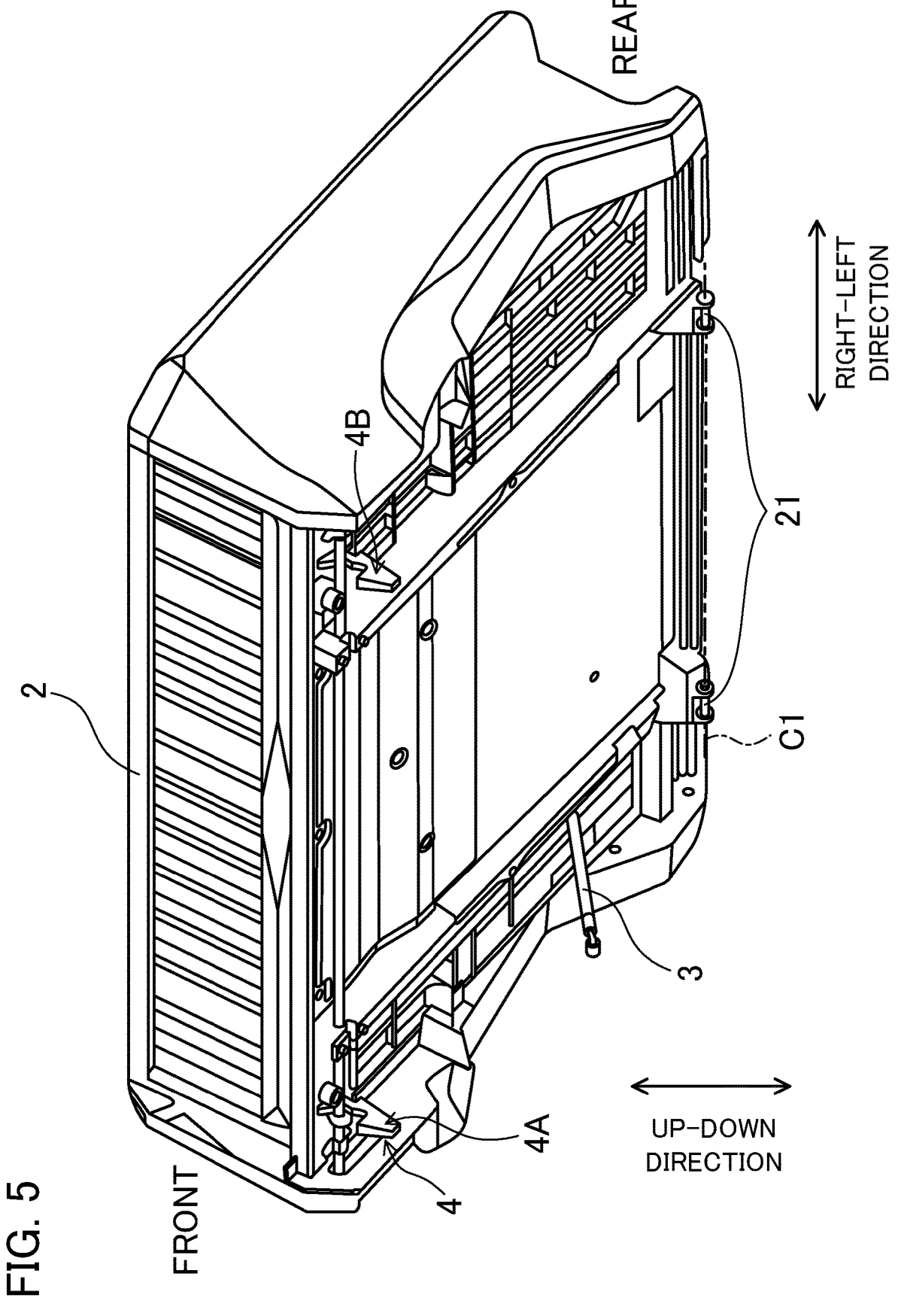
FIG. 5 is a perspective view of the cargo bed diagonally from below.

FIG. 5 is a perspective view of the cargo bed 2 diagonally from below. The cargo bed 2 rotates such that a front end portion thereof moves up and down about a rear end portion.

Specifically, the cargo bed 2 has a cargo bed shaft 21 extending in the vehicle width direction at a rear end portion of the bottom of the cargo bed 2. The cargo bed 2 has two cargo bed shafts 21 aligned coaxially with each other. The two cargo bed shafts 21 are located apart from each other in the vehicle width direction on the bottom of the cargo bed 2. The two cargo bed shafts 21 are attached to a rear end portion of the first longitudinal frame 11 (see FIG. 2) and a rear end portion of the second longitudinal frame 12 (see FIG. 2) so as to rotate about the cargo bed axis C1 in a state of the centers thereof being coincident with the cargo bed axis C1.

The lift spring 3 biases the cargo bed 2 from the lowered state to the lifted state. The lift spring 3 has an elastic structure, and biases the cargo bed 2 by elastic force. The lift spring 3 is located with being offset to one side with respect to the center of the cargo bed 2 in the vehicle width direction. In this example, the lift spring 3 is located with being offset to the right side with respect to the center of the cargo bed 2 in the vehicle width direction. In this example, the lift spring 3 is a rod-shaped gas spring. One end of the lift spring 3 in the length direction thereof is attached to the cargo bed 2, specifically the bottom of the cargo bed 2, and the other end of the lift spring 3 in the length direction thereof is attached to the base 1, specifically the first longitudinal frame 11 (see FIG. 2).

The lock 4 fixes (i.e., locks) the cargo bed 2 in the lowered state on the base 1. The lock 4 switches the cargo bed 2 between a fixed state and an unfixed state. Specifically, the lock 4 is located, below the cargo bed 2, on the opposite side of the center of the cargo bed 2 in the front-rear direction from the cargo bed axis C1, i.e., the front side with respect to the center of the cargo bed 2 in the front-rear direction. That is, in the lowered state of the cargo bed 2, the lock 4 fixes a portion of the cargo bed 2 on the opposite side of the center of the cargo bed 2 in the front-rear direction from the cargo bed axis C1.

The lock 4 includes a first lock 4A located offset to the same side as the lift spring 3 with respect to the center of the cargo bed 2 in the vehicle width direction and a second lock 4B located offset to the opposite side of the lift spring 3 with respect to the center of the cargo bed 2 in the vehicle width direction. The first lock 4A and the second lock 4B are aligned in the vehicle width direction. Hereinafter, for the sake of convenience in description, the side on which the lift spring 3 is located with respect to the center of the cargo bed 2 in the vehicle width direction will be referred to as an "offset side," and the side on which the lift spring 3 is not located with respect to the center of the cargo bed 2 in the vehicle width direction will be referred to as an "opposite offset side." In this example, the right side is the offset side, and the left side is the opposite offset side.

Figure 6:
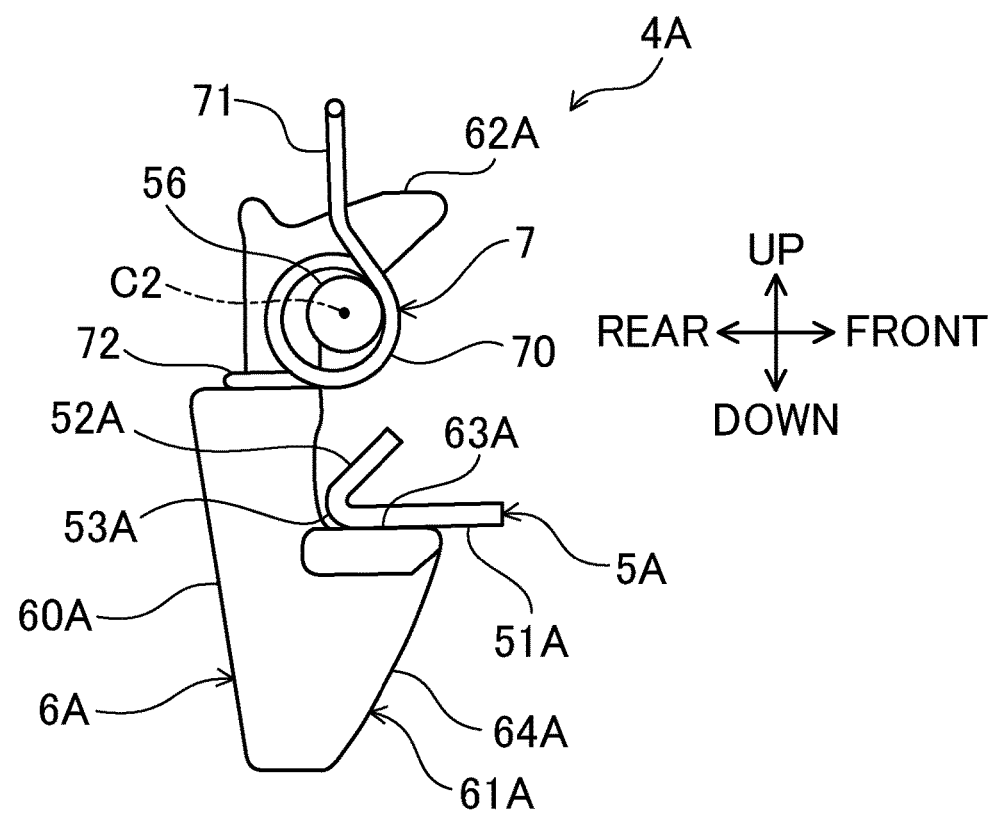
FIG. 6 is a side view of a first lock.

FIG. 6 is a side view of the first lock 4A. FIG. 6 shows the first lock 4A in an engaged state. The first lock 4A has a first striker 5A attached to the base 1, a first hook 6A attached to the cargo bed 2 and engaged with the first striker 5A when the cargo bed 2 is in the lowered state, and a lock spring 7 biasing the first hook 6A in a biasing direction of the first hook 6A being engaged with the first striker 5A.

Figure 7:
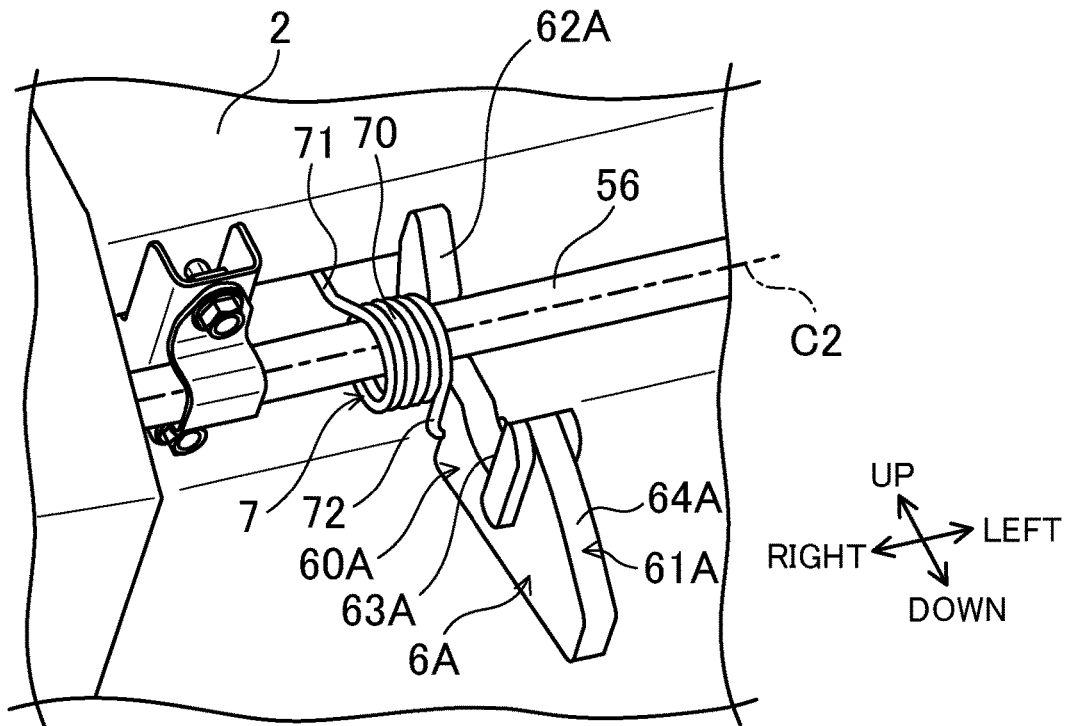
FIG. 7 is a perspective view of a first hook and members therearound diagonally from below.

FIG. 7 is a perspective view of the first hook 6A and members therearound diagonally from below. In this example, the first hook 6A is attached to the cargo bed 2 so as to rotate about a predetermined lock axis C2. Specifically, a lock shaft 56 extending in the vehicle width direction is attached to the bottom of the cargo bed 2 so as to rotate about the center of the lock shaft 56. The center of the lock shaft 56 is coincident with the lock axis C2. The lock axis C2 is substantially parallel with the cargo bed axis C1. The first hook 6A is unrotatably attached to the lock shaft 56. Thus, the first hook 6A rotates about the lock axis C2 integrally with the lock shaft 56. A lever rotating the lock shaft 56 about the lock axis C2 may be attached to at least one of both end portions of the lock shaft 56 in the vehicle width direction. The lever is operated by a user when the cargo bed 2 fixed by the lock 4 is unfixed.

Specifically, as shown in FIG. 6, the first hook 6A has a body 60A extending substantially parallel with a radial direction (hereinafter merely referred to as a "radial direction") about the lock axis C2 and a bent portion 61A bent from the body 60A. The body 60A is unrotatably attached to the lock shaft 56. The bent portion 61A is engaged with the first striker 5A when the cargo bed 2 is in the lowered state. The bent portion 61A is located at one end portion of the body 60A in the radial direction.

In this example, the lock spring 7 is a torsion coil spring. The lock spring 7 has a coil portion 70, a first arm 71 extending from one end of the coil portion 70, and a second arm 72 extending from the other end of the coil portion 70. The coil portion 70 is wound around the lock shaft 56. The first arm 71 is engaged with the cargo bed 2. The second arm 72 is engaged with the first hook 6A. The lock spring 7 biases the first hook 6A to one side in a circumferential direction about the lock axis C2. The one side in the circumferential direction about the lock axis C2 is a side on which the first hook 6A is engaged with the first striker 5A, and will be hereinafter referred to as an "engagement side." The opposite side of the engagement side in the circumferential direction about the lock axis C2 will be referred to as a "disengagement side."

The first hook 6A further has a stopper 62A limiting rotation of the first hook 6A about the lock axis C2. The stopper 62A is disposed at an end portion of the body 60A on the side opposite to the bent portion 61A. When the first hook 6A rotates to the engagement side in the circumferential direction about the lock axis C2 by biasing of the lock spring 7, the stopper 62A may contact the bottom of the cargo bed 2. By the contact of the stopper 62A with the bottom of the cargo bed 2, rotation of the first hook 6A to the engagement side in the circumferential direction is limited. In a normal state, i.e., when external force other than the elastic force of the lock spring 7 does not act on the first hook 6A, the first hook 6A is in a state of the stopper 62A contacting the bottom of the cargo bed 2 (hereinafter referred to as a "normal state"). In the normal state of the first hook 6A, the body 60A extends substantially downward from the bottom of the cargo bed 2, i.e., suspends from the bottom of the cargo bed 2. The bent portion 61A is bent substantially forward from the body 60A. The bent portion 61A has a hook engagement surface 63A contacting and engaged with the first striker 5A when the cargo bed 2 is in the lowered state and a hook slide surface 64A sliding on the outer surface of the first striker 5A when the cargo bed 2 transitions from the lifted state to the lowered state. The hook engagement surface 63A is located between a corner between the body 60A and the bent portion 61A and the front edge of the bent portion 61A. The hook slide surface 64A is located between the front edge of the bent portion 61A and the lower edge of the bent portion 61A. In the normal state of the first hook 6A, the hook slide surface 64A is positioned lower than the hook engagement surface 63A. When the cargo bed 2 is in the lowered state and the first hook 6A is in the normal state, the hook engagement surface 63A expands substantially in the horizontal direction, and the hook slide surface 64A is inclined with respect to the horizontal plane. Specifically, the hook slide surface 64A is inclined with respect to the horizontal plane so as to be positioned lower as extending rearward. More specifically, the hook slide surface 64A is curved so as to protrude diagonally downward to the front as viewed from the side.

Figure 8:
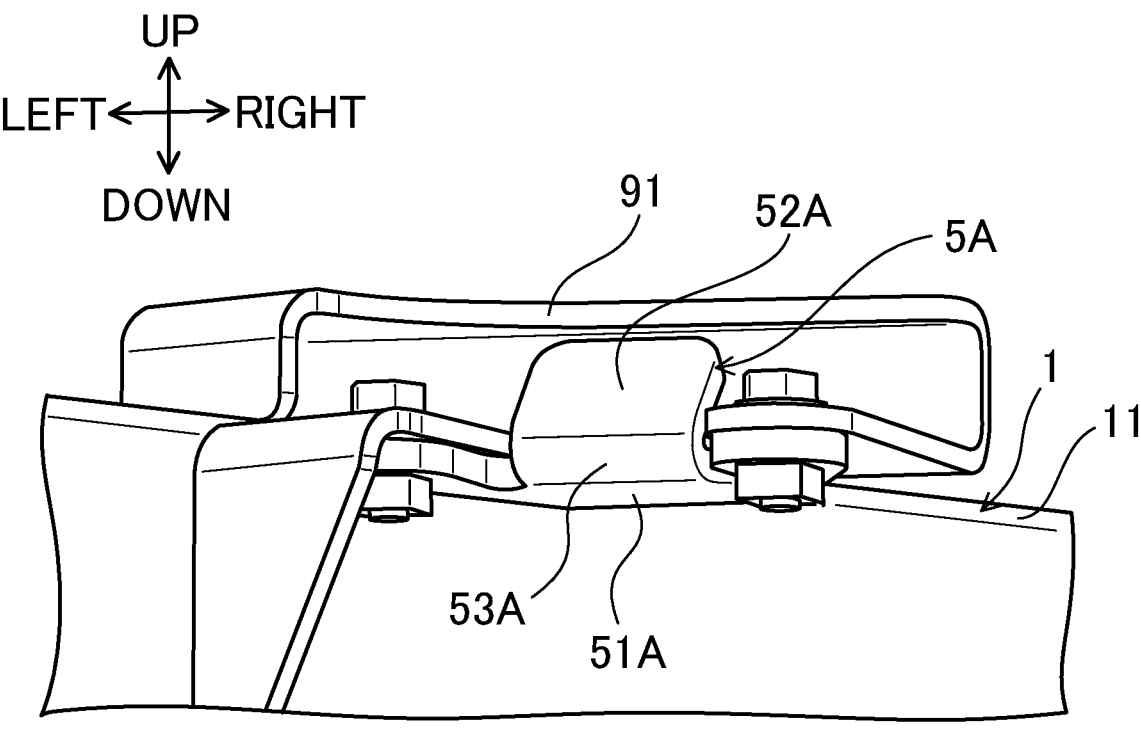
FIG. 8 is a perspective view of a first striker and members therearound diagonally from below.

FIG. 8 is a perspective view of the first striker 5A and members therearound diagonally from below. In this example, the first striker 5A is attached to the first longitudinal frame 11 through a first bracket 91. The first hook 6A is engaged with the first striker 5A when the cargo bed 2 is fixed by the lock 4. The first striker 5A is positioned in front with respect to the first hook 6A (specifically, body 60A) when the cargo bed 2 is in the lowered state.

Specifically, the first striker 5A has a first striker engagement surface 51A with which the bent portion 61A (specifically, hook engagement surface 63A) of the first hook 6A contacts (specifically, contacts from below) when the cargo bed 2 is in the lowered state, and a slide surface 52A which is located higher than the first striker engagement surface 51A and is inclined with respect to the horizontal plane and on which the bent portion 61A of the first hook 6A slides when the cargo bed 2 transitions from the lifted state to the lowered state. The first striker 5A may further have a curved surface 53A for guiding the first hook 6A to the first striker engagement surface 51A. Specifically, the curved surface 53A is positioned at the edge of the first striker engagement surface 51A. The first striker engagement surface 51A is one example of a striker engagement surface. In this example, as shown in FIG. 6, the first striker 5A is made of sheet metal. Specifically, the first striker 5A is configured such that a flat plate is partially bent.

The first striker engagement surface 51A is a surface facing downward. The first striker engagement surface 51A expands in the front-rear direction and the vehicle width direction, i.e., the horizontal direction. The curved surface 53A is connected to one edge of the first striker engagement surface 51A, specifically the rear edge of the first striker engagement surface 51A. The rear edge of the first striker engagement surface 51A faces the body 60A of the first hook 6A when the cargo bed 2 is in the lowered state. The curved surface 53A is curved upward from the first striker engagement surface 51A. In this example, the curved surface 53A is curved rearward and upward from the first striker engagement surface 51A, and is further curved upward and forward.

Figure 9:
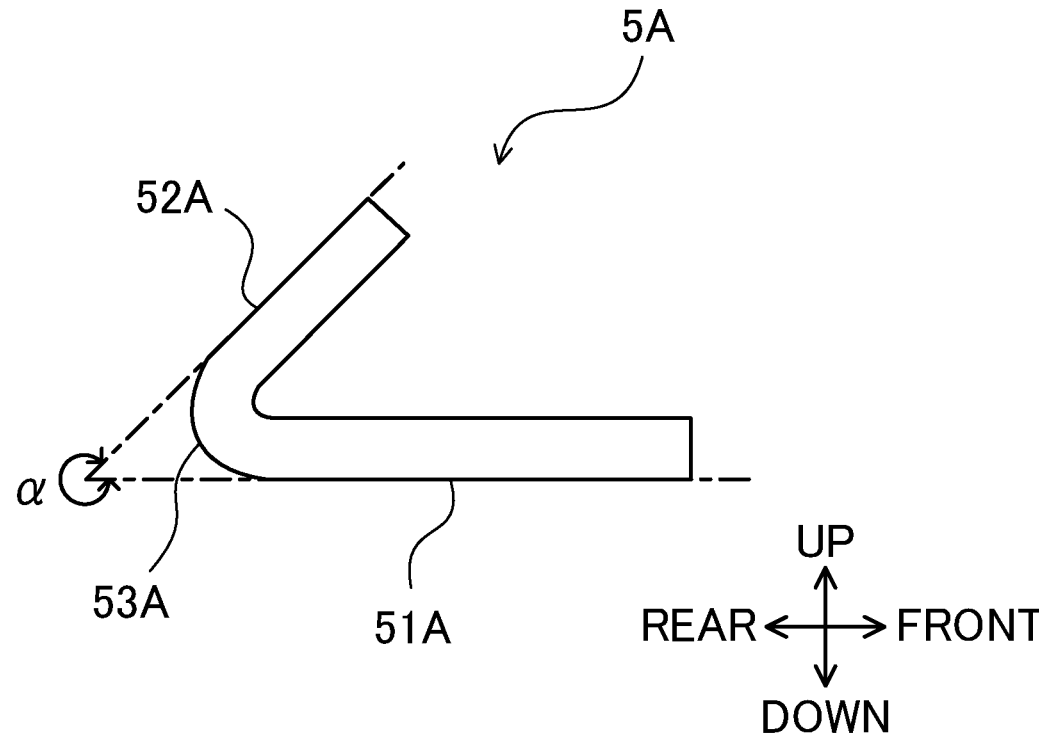
FIG. 9 is a side view of the first striker.

FIG. 9 is a side view of the first striker 5A. The slide surface 52A of the first striker 5A is inclined with respect to the horizontal plane. In this example, the slide surface 52A is inclined with respect to the horizontal plane so as to be positioned lower, i.e., approach the first striker engagement surface 51A, as extending rearward. In this example, an angle α between the first striker engagement surface 51A and the slide surface 52A is more than 270 degrees and less than 360 degrees. The slide surface 52A is connected to the curved surface 53A. That is, the slide surface 52A is connected to the first striker engagement surface 51A through the curved surface 53A.

Figure 10:
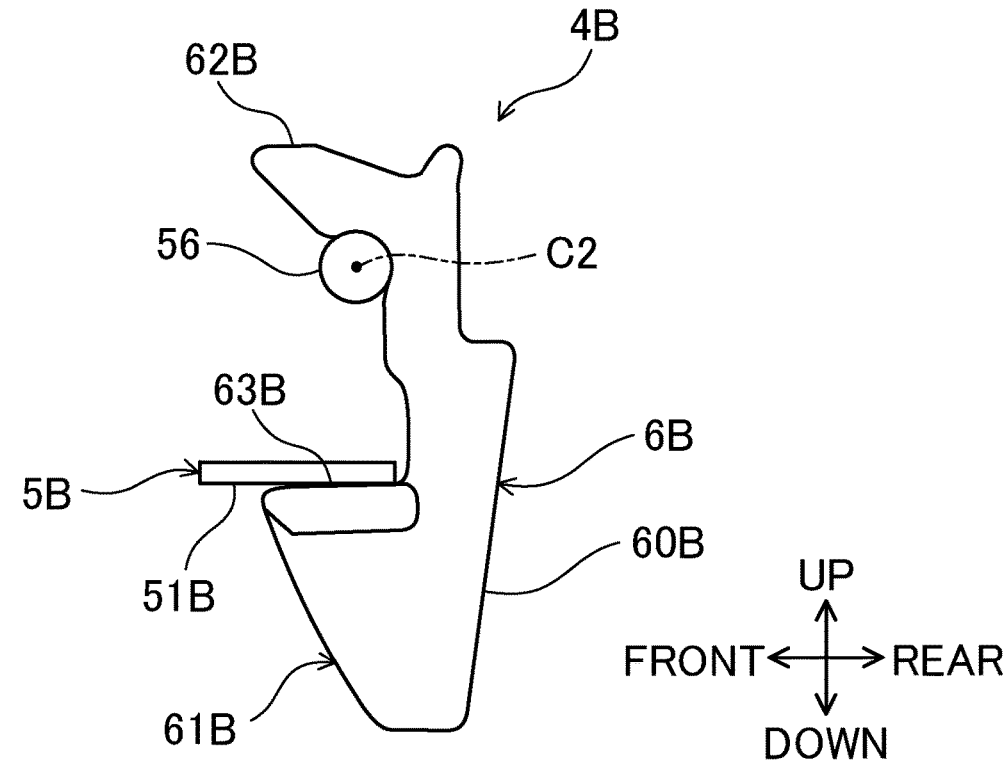
FIG. 10 is a side view of a second lock.

FIG. 10 is a side view of the second lock 4B. FIG. 10 shows the second lock 4B in an engaged state. The second lock 4B has a second striker 5B attached to the cargo bed 2 or the base 1 to which the first striker 5A is attached, and a second hook 6B attached to the cargo bed 2 or the base 1 to which the first hook 6A is attached so as to rotate about the lock axis C2 and engaged with the second striker 5B when the cargo bed 2 is in the lowered state.

Figure 11:
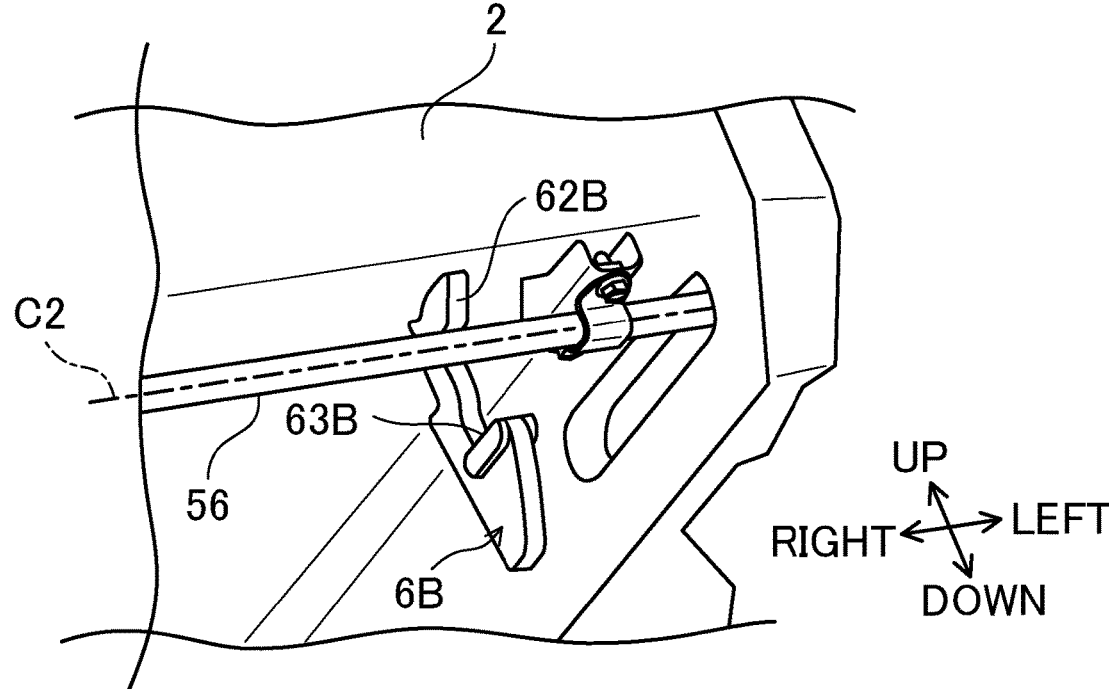
FIG. 11 is a perspective view of a second hook and members therearound diagonally from below.

FIG. 11 is a perspective view of the second hook 6B and members therearound diagonally from below. The second hook 6B is coupled to the first hook 6A so as to rotate integrally with the first hook 6A. Specifically, the second hook 6B is unrotatably attached to the lock shaft 56. Since the first hook 6A is also unrotatably attached to the lock shaft 56 as described above, the second hook 6B rotates integrally with the first hook 6A through the lock shaft 56. In this example, the second lock 4B does not have a lock spring biasing the second hook 6B about the lock axis C2 in a biasing direction of the second hook 6B being engaged with the second striker 5B. The second hook 6B is indirectly biased by the lock spring 7 attached to the first hook 6A.

A basic configuration of the second hook 6B is the same as that of the first hook 6A except that the lock spring is not attached. Thus, detailed description of a configuration similar to that of the first hook 6A will be omitted. The second hook 6B has a body 60B extending substantially parallel with the radial direction and a bent portion 61B bent from the body 60B. The second hook 6B further has a stopper 62B limiting rotation of the second hook 6B about the lock axis C2. When external force other than the elastic force of the lock spring 7 does not act on the second hook 6B, the second hook 6B is in a normal state of the stopper 62B contacting the bottom of the cargo bed 2. The bent portion 61B has a hook engagement surface 63B contacting and engaged with the second striker 5B when the cargo bed 2 is in the lowered state. The body 60B, bent portion 61B, and stopper 62B of the second hook 6B each correspond to the body 60A, bent portion 61A, and stopper 62A of the first hook 6A. The hook engagement surface 63B of the bent portion 61B corresponds to the hook engagement surface 63A of the first hook 6A.

Figure 12:
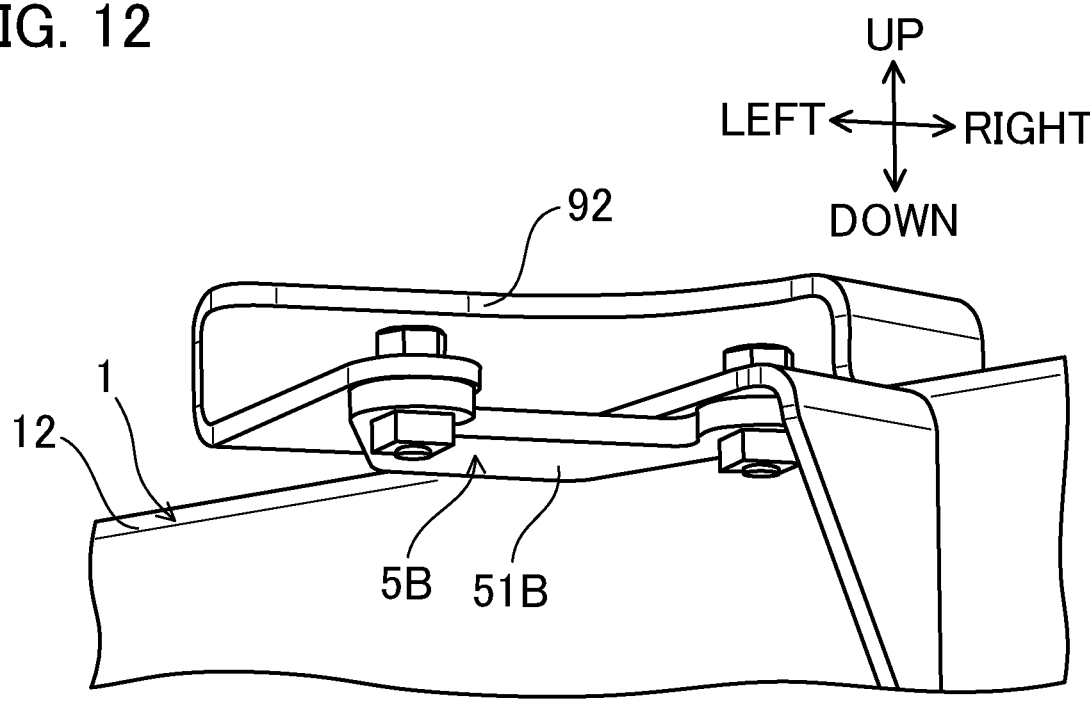
FIG. 12 is a perspective view of a second striker and members therearound diagonally from below.

FIG. 12 is a perspective view of the second striker 5B and members therearound diagonally from below. In this example, the second striker 5B is attached to the second longitudinal frame 12 through a second bracket 92.

Specifically, the second striker 5B has a second striker engagement surface 51B which faces downward and with which the bent portion 61B (specifically, hook engagement surface 63B) of the second hook 6B contacts from below when the cargo bed 2 is in the lowered state. In this example, the second striker 5B is in a plate shape (specifically, flat plate shape) expanding in the front-rear direction and the vehicle width direction.

Figure 13:
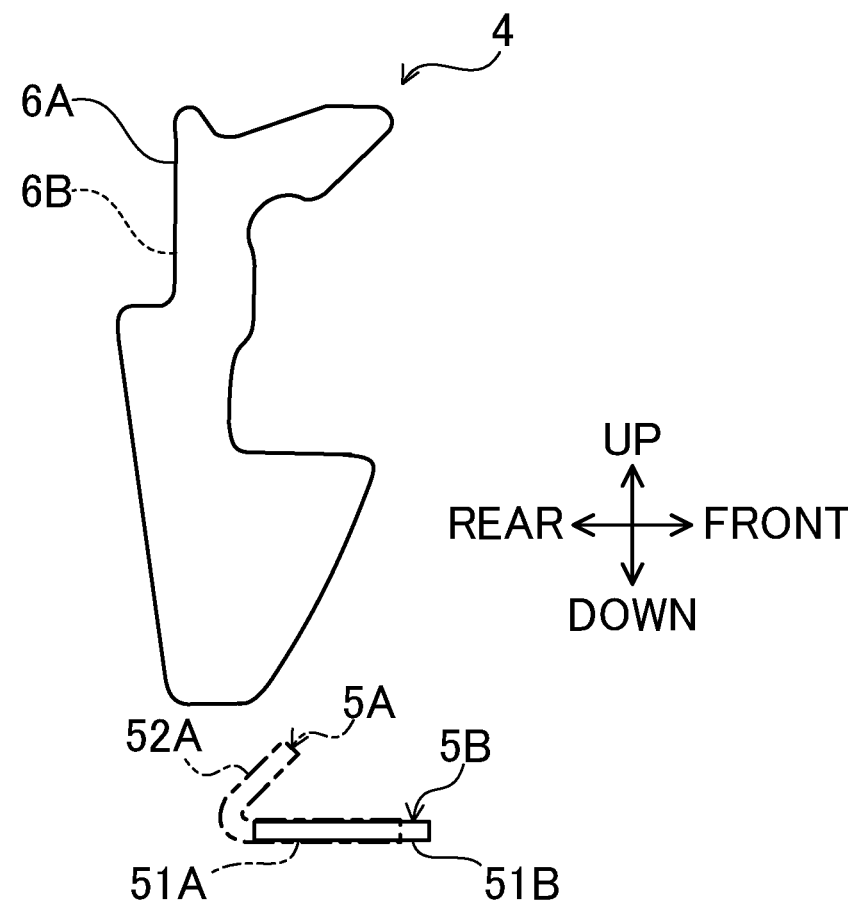
FIG. 13 is a side view of a lock.

Here, a positional relationship between the first hook 6A and the second hook 6B in an up-down direction and the vehicle width direction and a positional relationship between the first striker 5A and the second striker 5B in the up-down direction and the vehicle width direction will be described. FIG. 13 is a side view of the lock 4 when the cargo bed 2 is in the lifted state. In FIG. 13, for the sake of convenience in description, the lock shaft 56 and the lock spring 7 are not shown, and the first striker 5A is indicated by a chain line.

In this example, the position of the second hook 6B in the up-down direction is substantially coincident with the position of the first hook 6A in the up-down direction when the cargo bed 2 is in the lifted state. In this example, the position of the second hook 6B in the front-rear direction is substantially coincident with the position of the first hook 6A in the front-rear direction. In this example, the first striker 5A is located offset from the second striker 5B in a direction from the upper end to the lower end of the slide surface 52A in the front-rear direction. Specifically, the first striker 5A is located offset rearward from the second striker 5B. In this example, the position of the second striker engagement surface 51B in the up-down direction is substantially coincident with the position of the first striker engagement surface 51A in the up-down direction.

Figure 14:
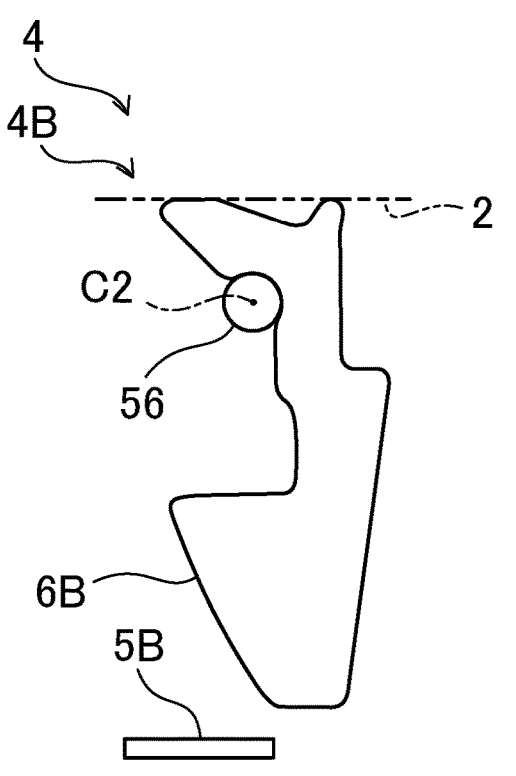
FIG. 14 is a side view for describing lock operation.
Figure 14:
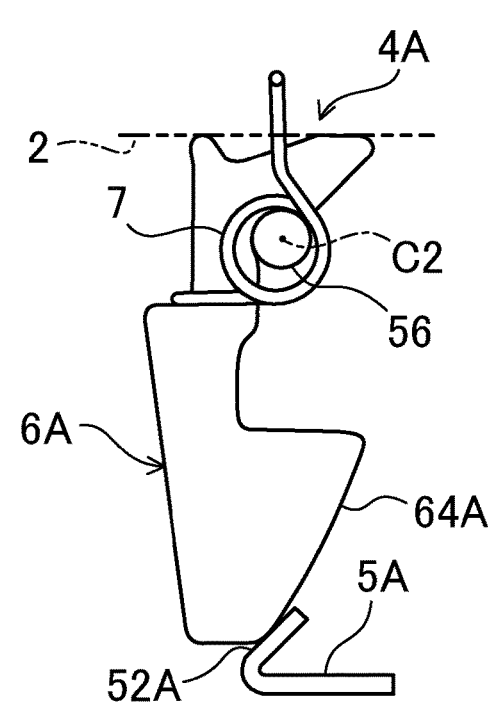
Figure 15:
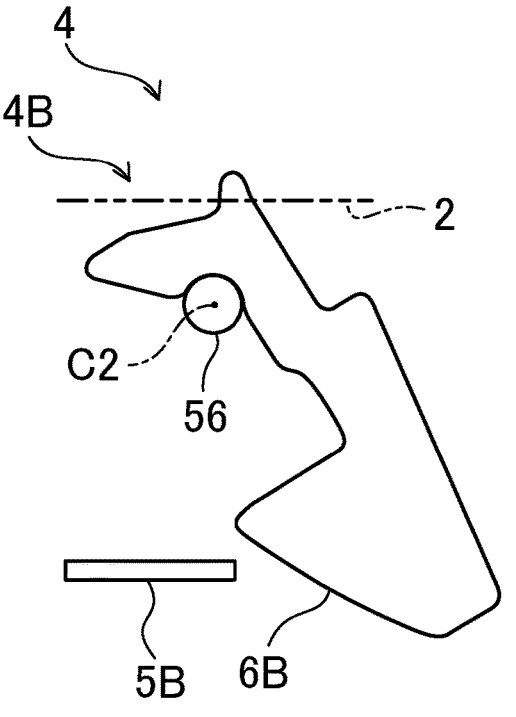
FIG. 15 is a side view for describing the lock operation.
Figure 15:
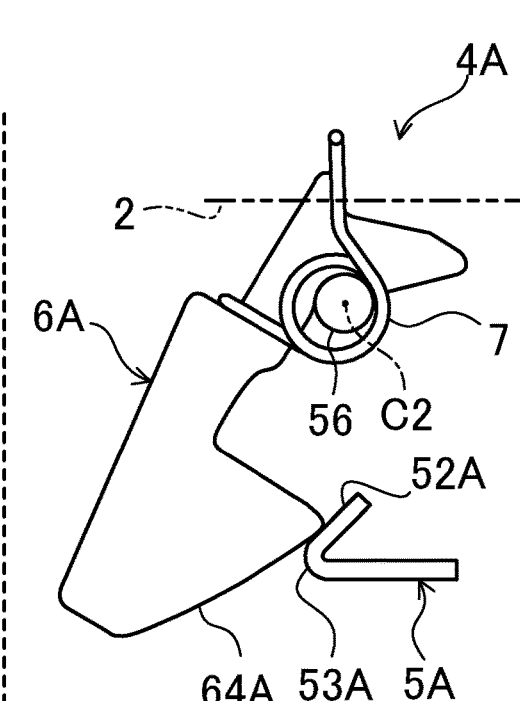
Figure 16:
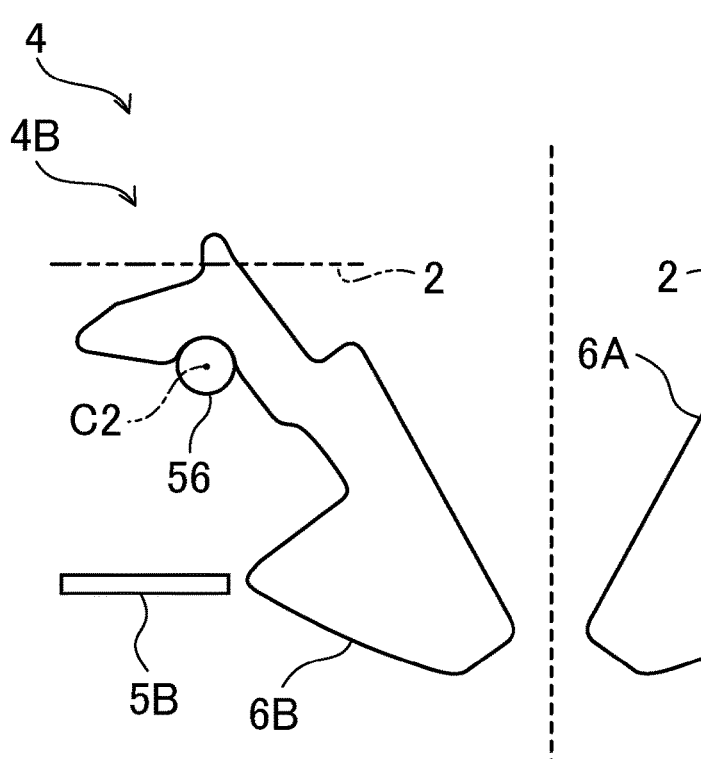
FIG. 16 is a side view for describing the lock operation.
Figure 16:
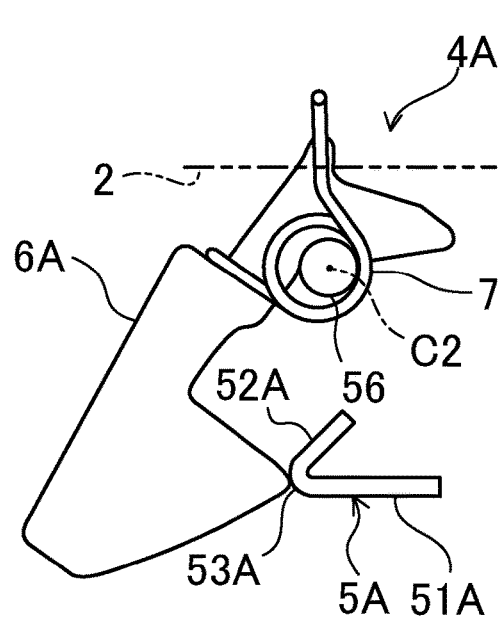
Figure 17:
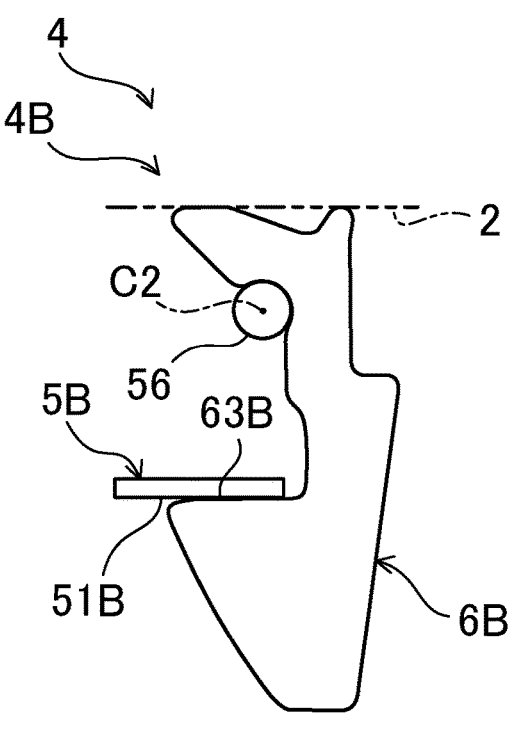
FIG. 17 is a side view for describing the lock operation.
Figure 17:
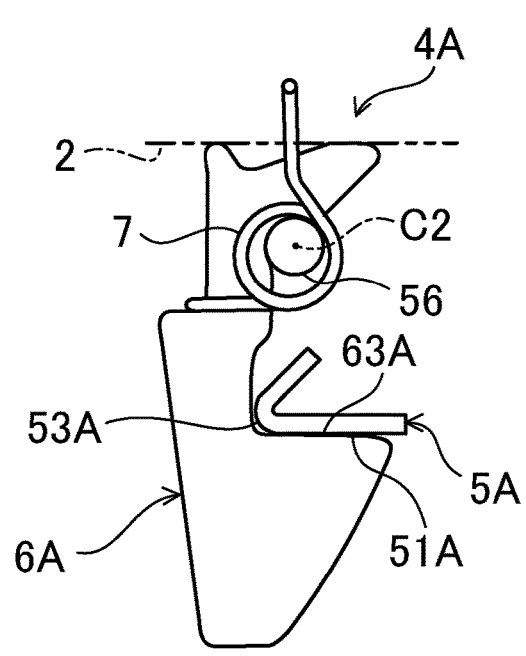

Subsequently, lock operation of the lock 4 when the cargo bed 2 transitions from the lifted state to the lowered state will be described. FIGS. 14 to 17 are side views for describing the lock operation. Specifically, FIGS. 14 to 16 are side views showing the lock 4 during the lock operation. FIG. 17 is a side view showing the lock 4 in a state of the cargo bed 2 being locked to the base 1, i.e., the lowered state. In each of FIGS. 14 to 17, lock operation of the first lock 4A is shown on the right side on the plane of paper, and lock operation of the second lock 4B is shown on the left side on the plane of paper. Note that in FIGS. 14 to 17 and FIGS. 20 to 25 described later, the bottom of the cargo bed 2 is indicated by a two-dot chain line for the sake of convenience in description.

First, the user pushes down the cargo bed 2 in the lifted state. Accordingly, the cargo bed 2 is lowered. The first hook 6A and the second hook 6B are in the normal state. When the cargo bed 2 is lowered, the first hook 6A eventually contacts the first striker 5A as shown in FIG. 14. Specifically, the hook slide surface 64A of the first hook 6A contacts the slide surface 52A of the first striker 5A. At this time, the second hook 6B does not contact the second striker 5B.

As the user further pushes down the cargo bed 2, the first hook 6A contacts the first striker 5A, and accordingly, rotates in the reverse direction of the biasing direction, i.e., the disengagement side in the circumferential direction about the lock axis C2, against the elastic force of the lock spring 7, as shown in FIG. 15. That is, the first hook 6A rotates to the disengagement side in the circumferential direction about the lock axis C2 by reactive force received from the first striker 5A. At this time, the second hook 6B rotates integrally with the first hook 6A through the lock shaft 56. The second hook 6B rotates to the disengagement side in the circumferential direction about the lock axis C2 without contacting the second striker 5B by rotation of the first hook 6A in the reverse direction. As the cargo bed 2 is lowered, the first hook 6A slides on the slide surface 52A of the first striker 5A. A contact point between the first hook 6A and the first striker 5A moves to the curved surface 53A on the slide surface 52A.

When the cargo bed 2 is further pushed down, the contact point between the first hook 6A and the first striker 5A reaches the curved surface 53A as shown in FIG. 16. Since the curved surface 53A is curved, the first hook 6A smoothly slides on the curved surface 53A. Eventually, the first hook 6A is released from the reactive force to the disengagement side in the circumferential direction from the first striker 5A. When released from the reactive force from the first striker 5A, the first hook 6A rotates in the forward direction which is the biasing direction by the elastic force of the lock spring 7. At this time, the second hook 6B does not contact the second striker 5B.

When the cargo bed 2 is further pushed down, the contact point between the first hook 6A and the first striker 5A moves to the first striker engagement surface 51A from the curved surface 53A as shown in FIG. 17. Finally, the hook engagement surface 63A of the first hook 6A contacts and is engaged with the first striker engagement surface 51A. In this manner, the first hook 6A is engaged with the first striker 5A. When the hook engagement surface 63A of the first hook 6A contacts the first striker engagement surface 51A, the second hook 6B starts contacting the second striker 5B. Specifically, the hook engagement surface 63B of the second hook 6B contacts the second striker engagement surface 51B of the second striker 5B. In this manner, the second hook 6B is also engaged with the second striker 5B. In this manner, the cargo bed 2 is fixed onto the base 1 by the lock 4.

Figure 18:
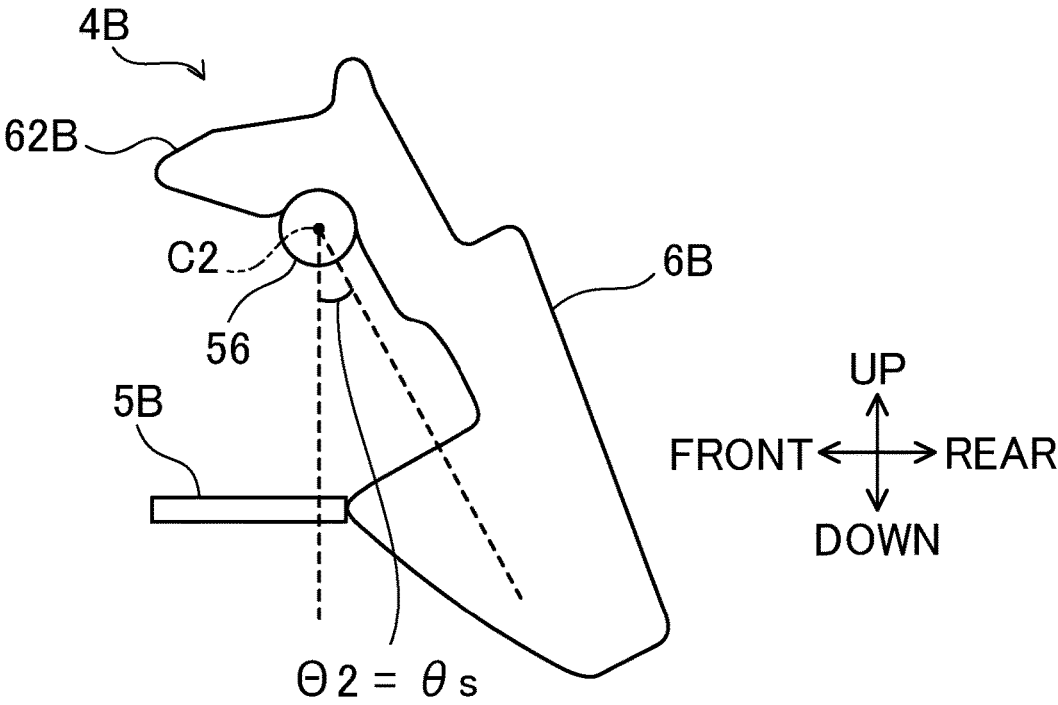
FIG. 18 is a view for describing the reference angle of the second hook.
Figure 19:
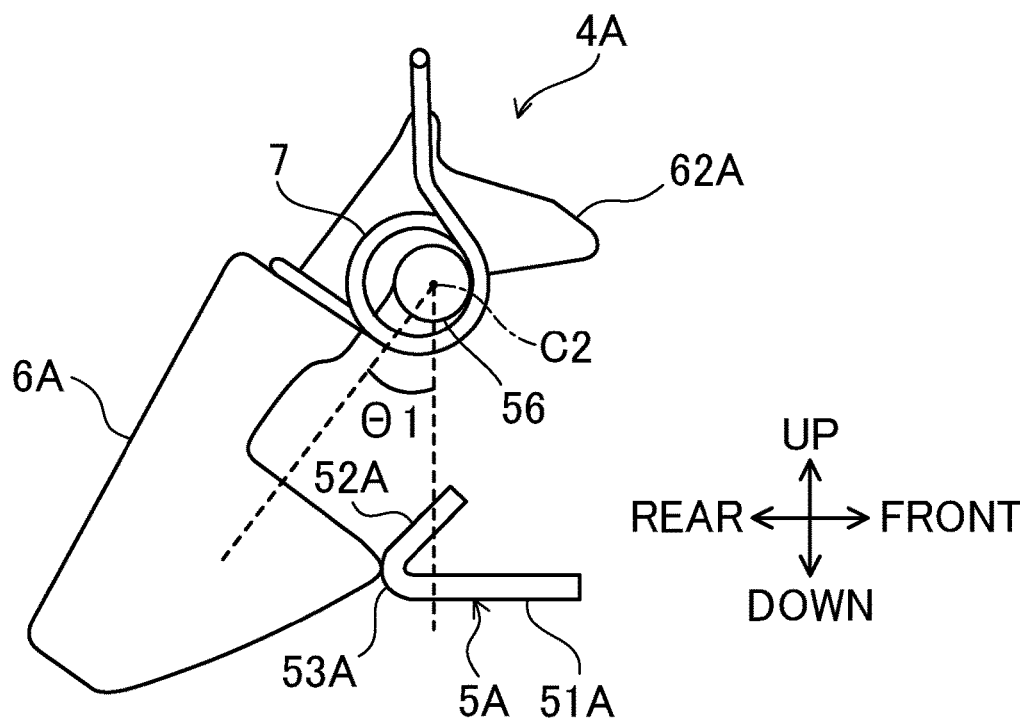
FIG. 19 is a view for describing the rotation angle of the first hook when the rotation direction of the first hook switches from a reverse direction to a forward direction.

The lock operation of the lock 4 will be described in more detail using the rotation angles of the first hook 6A and the second hook 6B. FIG. 18 is a view for describing the reference angle θs of the second hook 6B. FIG. 18 shows the second hook 6B when a rotation angle Θ2 is the reference angle θs. FIG. 19 is a view for describing the rotation angle Θ1 of the first hook 6A when the rotation direction of the first hook 6A switches from the reverse direction to the forward direction. The rotation angle Θ1 of the first hook 6A means the rotation angle of the first hook 6A about the lock axis C2 from the first hook 6A in the normal state, i.e., the first hook 6A in a state of the stopper 62A contacting the bottom of the cargo bed 2. The same also applies to the rotation angle Θ2 of the second hook 6B.

The second hook 6B does not contact the second striker 5B by rotating by an angle greater than the reference angle θs when the cargo bed 2 transitions from the lifted state to the lowered state. Specifically, if the second hook 6B does not rotate integrally with the first hook 6A (i.e., if the second hook 6B does not interlock with the first hook 6A), when the cargo bed 2 transitions from the lifted state to the lowered state, the second hook 6B contacts the second striker 5B. As the cargo bed 2 is lowered, a contact point between the second hook 6B and the second striker 5B moves to a rear end portion of the second striker 5B from the upper surface of the second striker 5B. At this time, the second hook 6B rotates to the disengagement side in the circumferential direction. As shown in FIG. 18, the rotation angle Θ2 of the second hook 6B is the maximum when the contact point between the second hook 6B and the second striker 5B is positioned at the rear end portion of the second striker 5B. The degrees of the rotation angle Θ2 of the second hook 6B at this time are the reference angle θs. That is, the reference angle θs is the maximum rotation angle Θ2 in a case where the second hook 6B contacts the second striker 5B. After the rotation angle Θ2 of the second hook 6B has reached the reference angle θs, the second hook 6B rotates to the engagement side in the circumferential direction and is engaged with the second striker 5B.

Before the rotation direction of the rotating first hook 6A switches from the reverse direction to the forward direction by contact with the first striker 5A when the cargo bed 2 transitions from the lifted state to the lowered state, the degrees of the rotation angle Θ1 of the first hook 6A are greater than the reference angle θs. Specifically, when the cargo bed 2 transitions from the lifted state to the lowered state, the contact point between the first hook 6A and the first striker 5A slides on the slide surface 52A and moves to the curved surface 53A. At this time, the first hook 6A rotates to the disengagement side in the circumferential direction. As shown in FIG. 19, the rotation angle Θ1 of the first hook 6A is the maximum when the contact point between the first hook 6A and the first striker 5A is positioned on the curved surface 53A. The first hook 6A switches from the reverse direction to the forward direction when the rotation angle Θ1 is the maximum. The degrees of the rotation angle Θ1 of the first hook 6A at this time are greater than the reference angle θs. That is, as described above, before the rotation direction of the first hook 6A switches from the reverse direction to the forward direction, the degrees of the rotation angle Θ1 of the first hook 6A are greater than the reference angle θs. Since the second hook 6B rotates integrally with the first hook 6A, the degrees of the rotation angle Θ2 of the second hook 6B are also greater than the reference angle θs before the rotation direction of the first hook 6A switches from the reverse direction to the forward direction. That is, in this example, when the cargo bed 2 transitions from the lifted state to the lowered state, the second hook 6B does not contact the second striker 5B.

Figure 20:
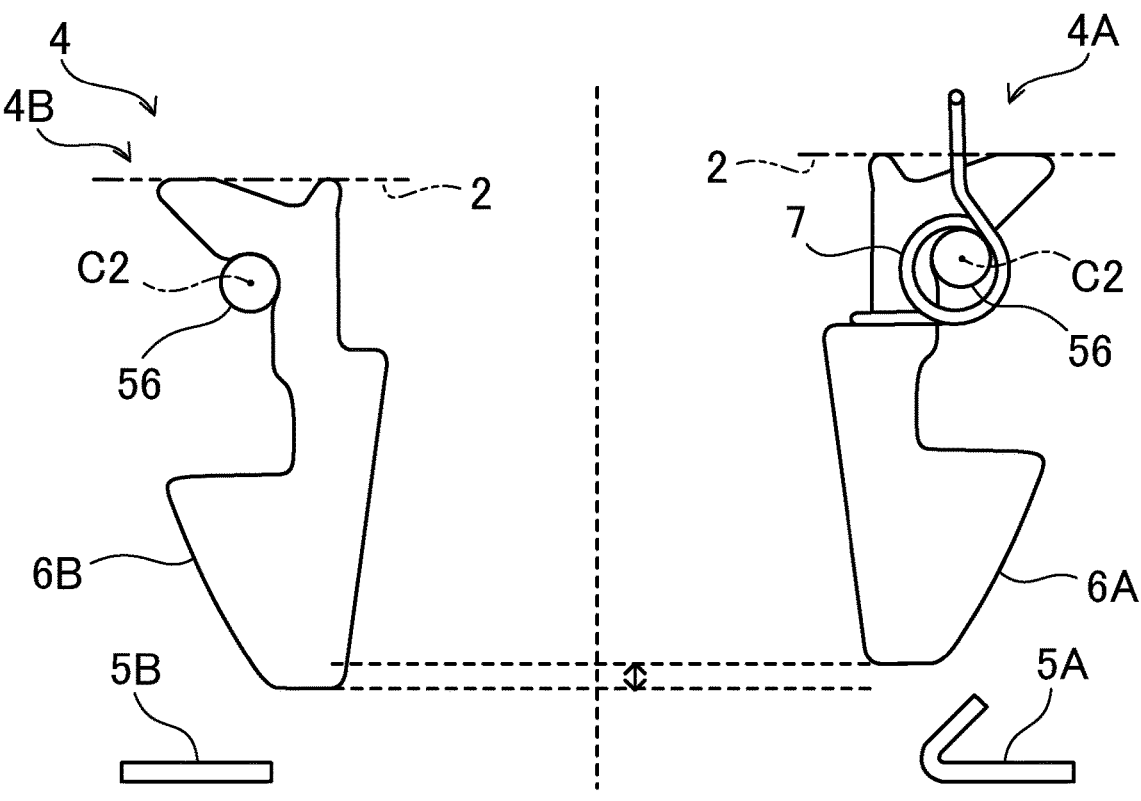
FIG. 20 is a side view for describing the lock operation.

When the user pushes down the cargo bed 2 in the lifted state, the biasing force of the lift spring 3 (see FIG. 2) serves as resistance when the cargo bed 2 is pushed down. The lift spring 3 is located on the one side, i.e., the offset side, with respect to the center of the cargo bed 2 in the vehicle width direction. Thus, when the cargo bed 2 is pushed down, the resistance on the offset side is greater in the vehicle width direction. As a result, as shown in FIG. 20, when the user pushes down the cargo bed 2 with standing on any of the right and left sides of the cargo bed 2, a portion of the cargo bed 2 on the offset side may be higher than a portion of the cargo bed 2 on the opposite offset side. FIG. 20 is a side view showing the lock 4 at a stage of the user starting pushing down the cargo bed 2 in the lifted state.

In this case, the second hook 6B may contact the second striker 5B earlier than the timing of the first hook 6A contacting the first striker 5A, and may rotate in the reverse direction of the biasing direction of the lock spring 7. When the cargo bed 2 is further lowered, the second hook 6B may rotate in the forward direction which is the same direction as the biasing direction of the lock spring 7 before the first hook 6A. That is, the second hook 6B starts being engaged with the second striker 5B. In some cases, the user determines, at this stage, that the cargo bed 2 has been locked to the base 1. In this case, the user does not further push down the cargo bed 2. However, at this stage, engagement between the second hook 6B and the second striker 5B is insufficient, and the first hook 6A is not engaged with the first striker 5A. That is, the cargo bed 2 is not sufficiently locked to the base 1, and is in an insufficient lock state.

The lock operation of the lock 4 in a case where the offset side of the cargo bed 2 is higher than the opposite offset side of the cargo bed 2 will be described. FIGS. 21 to 25 are side views for describing the lock operation in a case where the offset side of the cargo bed 2 is higher than the opposite offset side of the cargo bed 2. Specifically, FIGS. 21 to 24 are side views showing the cargo bed 2 during the lock operation. FIG. 25 is a side view showing the lock 4 in a state of the cargo bed 2 being locked to the base 1, i.e., the lowered state. In each of FIGS. 21 to 25, the lock operation of the first lock 4A is shown on the right side on the plane of paper, and the lock operation of the second lock 4B is shown on the left side on the plane of paper.

Figure 21:
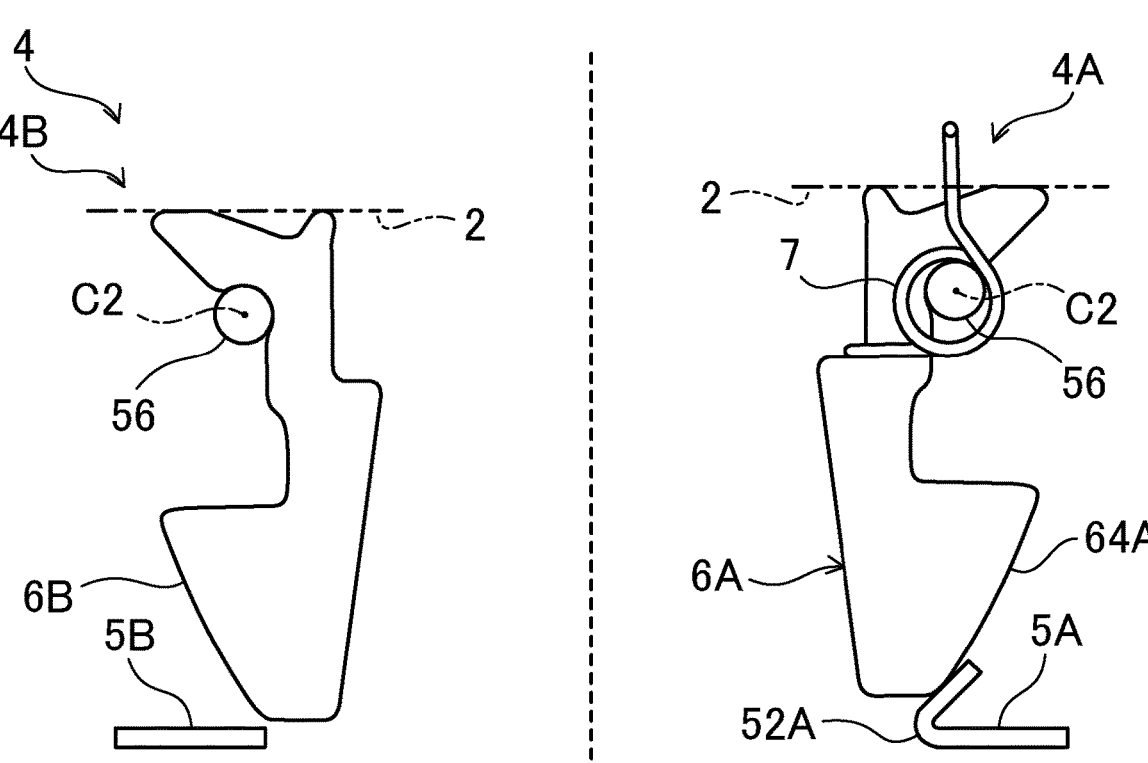
FIG. 21 is a side view for describing the lock operation.

First, the user pushes down the cargo bed 2 in the lifted state. Accordingly, the cargo bed 2 is lowered. When the cargo bed 2 is lowered, the first hook 6A eventually contacts the first striker 5A as shown in FIG. 21. Specifically, the hook slide surface 64A of the first hook 6A contacts the slide surface 52A of the first striker 5A. At this time, the second hook 6B does not contact the second striker 5B.

Figure 22:
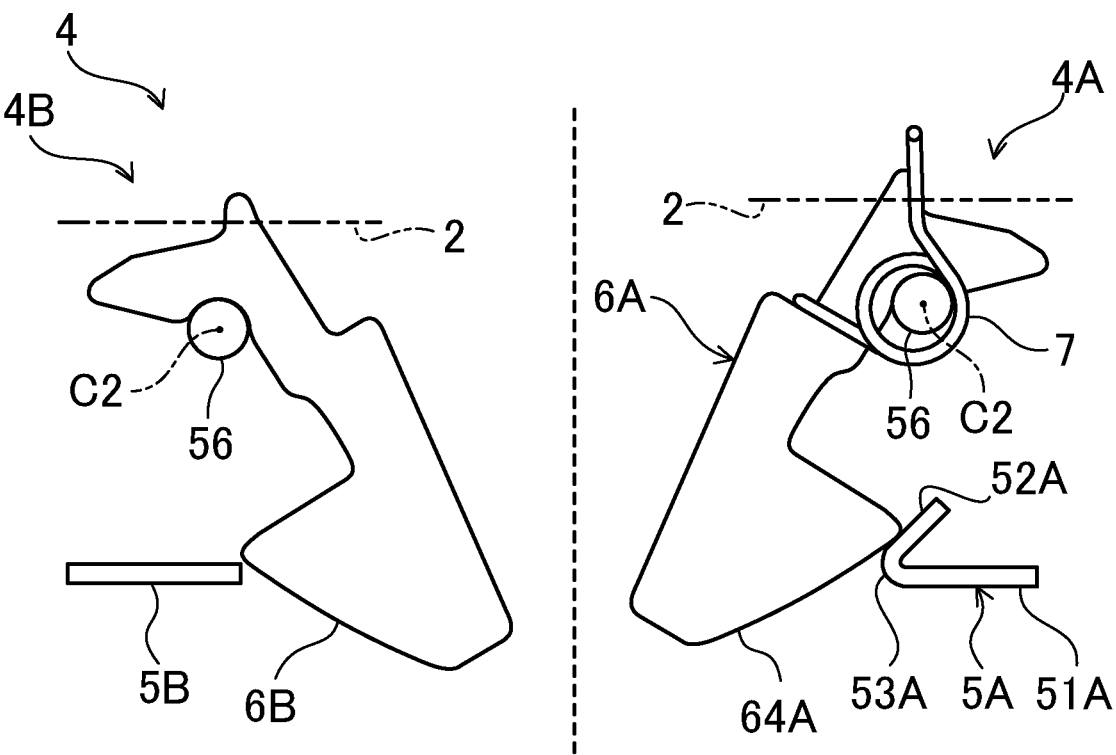
FIG. 22 is a side view for describing the lock operation.

As the user further pushes down the cargo bed 2, the first hook 6A contacts the first striker 5A, and accordingly, rotates in the reverse direction of the biasing direction, i.e., the disengagement side in the circumferential direction about the lock axis C2, against the elastic force of the lock spring 7, as shown in FIG. 22. That is, the first hook 6A rotates to the disengagement side in the circumferential direction about the lock axis C2 by the reactive force received from the first striker 5A. At this time, the second hook 6B rotates integrally with the first hook 6A through the lock shaft 56. The second hook 6B rotates to the disengagement side in the circumferential direction about the lock axis C2 without contacting the second striker 5B by rotation of the first hook 6A in the reverse direction. As the cargo bed 2 is lowered, the first hook 6A slides on the slide surface 52A of the first striker 5A. The contact point between the first hook 6A and the first striker 5A moves to the curved surface 53A on the slide surface 52A.

Figure 23:
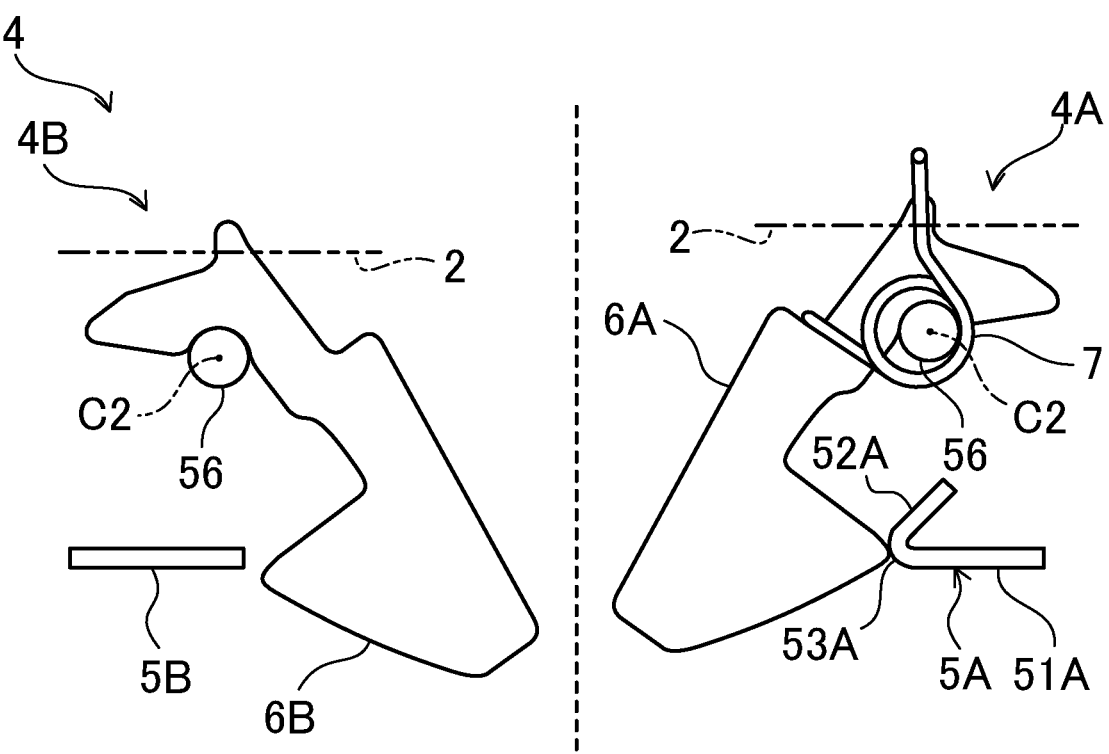
FIG. 23 is a side view for describing the lock operation.

When the cargo bed 2 is further pushed down, the contact point between the first hook 6A and the first striker 5A reaches the curved surface 53A as shown in FIG. 23. Since the curved surface 53A is curved, the first hook 6A smoothly slides on the curved surface 53A. Eventually, the first hook 6A is released from the reactive force to the disengagement side in the circumferential direction from the first striker 5A. When released from the reactive force from the first striker 5A, the first hook 6A rotates in the forward direction which is the biasing direction by the elastic force of the lock spring 7. At this time, the second hook 6B does not contact the second striker 5B.

Figure 24:
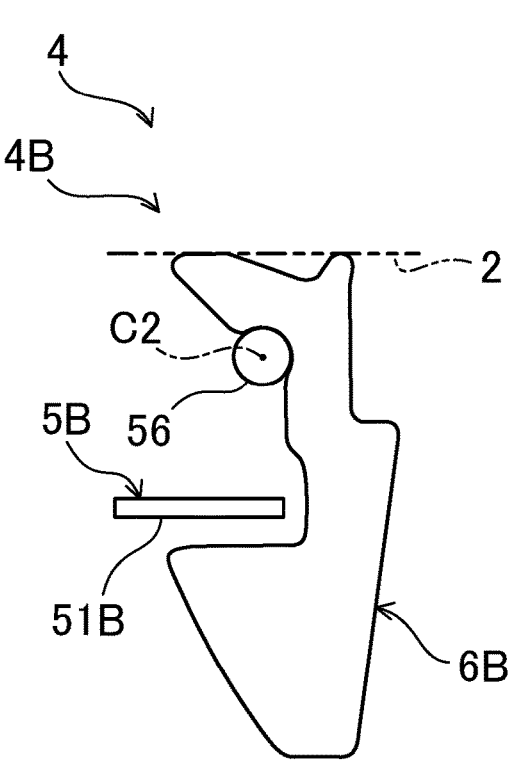
FIG. 24 is a side view for describing the lock operation.
Figure 24:
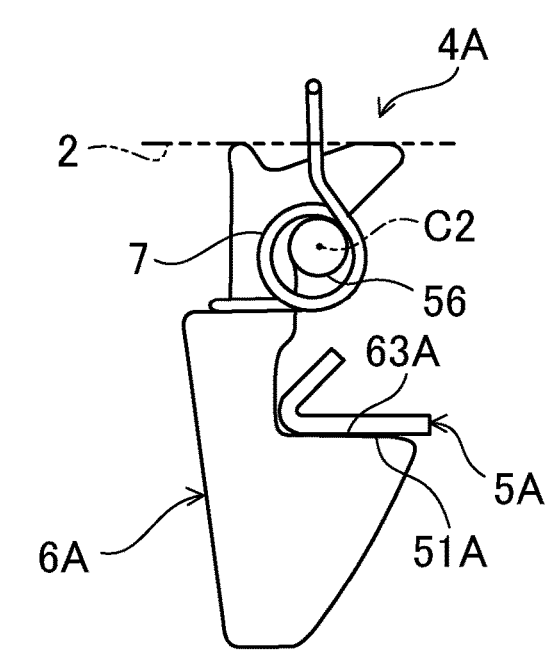
Figure 25:
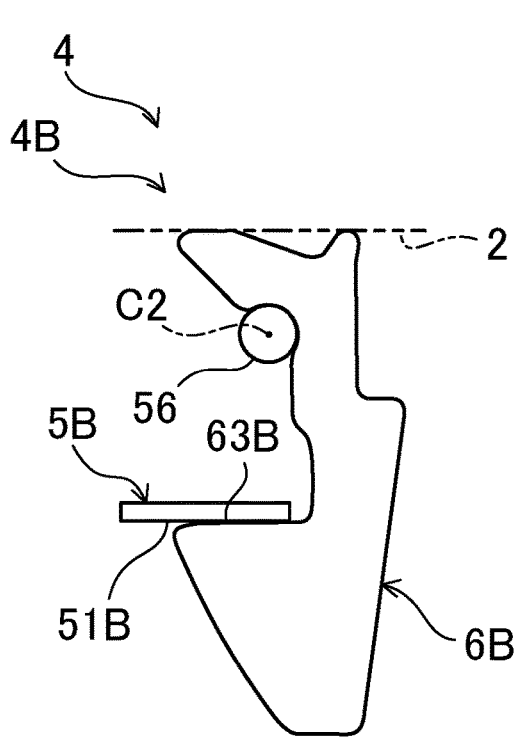
FIG. 25 is a side view for describing the lock operation.
Figure 25:
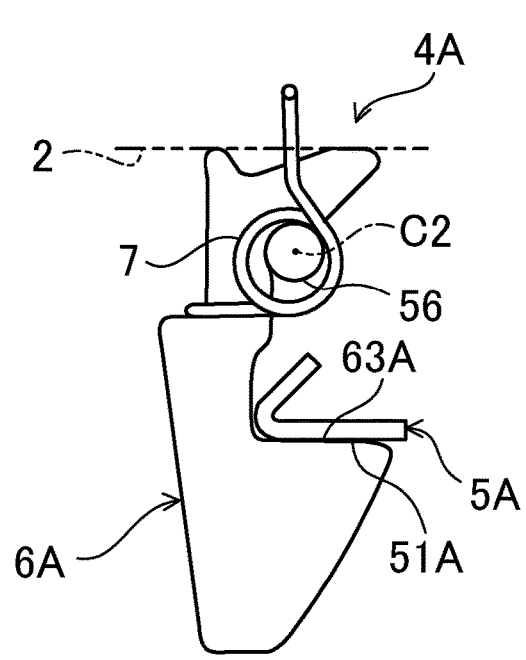

When the cargo bed 2 is further pushed down, the contact point between the first hook 6A and the first striker 5A moves to the first striker engagement surface 51A from the curved surface 53A as shown in FIG. 24. Finally, the hook engagement surface 63A of the first hook 6A contacts and is engaged with the first striker engagement surface 51A. In this manner, the first hook 6A is engaged with the first striker 5A. when the hook engagement surface 63A of the first hook 6A contacts the first striker engagement surface 51A, the second hook 6B rotates to the engagement side in the circumferential direction. Since the offset side of the cargo bed 2 is higher than the opposite offset side of the cargo bed 2, the second hook 6B is positioned lower than the first hook 6A in terms of a position in the up-down direction at the moment when engagement of the first hook 6A with the first striker 5A is completed.

Thereafter, by biasing of the lift spring 3 (see FIG. 2), the hook engagement surface 63B of the second hook 6B is instantaneously lifted and contacts the second striker engagement surface 51B of the second striker 5B, as shown in FIG. 25. In this manner, the second hook 6B is also engaged with the second striker 5B. In this manner, the cargo bed 2 is fixed onto the base 1 by the lock 4.

As described above, before the rotation direction of the rotating first hook 6A switches from the reverse direction to the forward direction by contact with the first striker 5A when the cargo bed 2 transitions from the lifted state to the lowered state, the degrees of the rotation angle $\Theta 1$ of the first hook 6A are greater than the reference angle $\theta s$. That is, before the rotation direction of the first hook 6A switches from the reverse direction to the forward direction, the degrees of the rotation angle $\Theta 2$ of the second hook 6B are also greater than the reference angle $\theta s$. Thus, even in a case where the offset side of the cargo bed 2 is higher than the opposite offset side of the cargo bed 2, the second hook 6B does not contact the second striker 5B.

In a case of unlocking the cargo bed 2 from the base 1, the user rotates, for example, the lever attached to the lock shaft 56. Accordingly, the lock shaft 56 rotates about the lock axis C2, and the first hook 6A rotates to the disengagement side in the circumferential direction. That is, the first hook 6A and the first striker 5A are disengaged from each other. Similarly, the second hook 6B also rotates to the disengagement side in the circumferential direction. That is, the second hook 6B and the second striker 5B are disengaged from each other. In this manner, the cargo bed 2 is unlocked from the base 1.

According to the above-described lock operation of the lock 4, the second hook 6B does not contact the second striker 5B while the cargo bed 2 is transitioning from the lifted state to the lowered state, and therefore, the above-described insufficient lock state can be avoided. Specifically, the second hook 6B does not start being engaged with the second striker 5B before the timing of engagement of the first hook 6A with the first striker 5A. The second hook 6B is engaged with the second striker 5B substantially at the same time as the timing of engagement of the first hook 6A with the first striker 5A. With this configuration, a probability of the cargo bed 2 being insufficiently locked to the base 1 can be reduced.

Particularly in this example, the first striker 5A has the slide surface 52A. The slide surface 52A is located higher than the first striker engagement surface 51A and is inclined with respect to the horizontal plane, and the bent portion 61A of the first hook 6A slides on the slide surface 52A when the cargo bed 2 transitions from the lifted state to the lowered state. Thus, when the cargo bed 2 transitions from the lifted state to the lowered state, the first hook 6A contacts the slide surface 52A of the first striker 5A earlier than the timing of the second hook 6B contacting the second striker 5B and rotates in the reverse direction of the biasing direction against the elastic force of the lock spring 7. The second hook 6B rotates without contacting the second striker 5B by rotation of the first hook 6A in the reverse direction. That is, the above-described configuration in which the second hook 6B does not contact the second striker 5B while the cargo bed 2 is transitioning from the lifted state to the lowered state can be effectively achieved.

The first striker 5A is located in rear with respect to the second striker 5B in terms of a position in the front-rear direction. With this configuration, as compared to a case where the position of the first striker 5A in the front-rear direction and the position of the second striker 5B in the front-rear direction are coincident with each other, a distance in the front-rear direction between the curved surface 53A of the first striker 5A and the lock axis C2 can be increased. Thus, as compared to the case where the position of the first striker 5A in the front-rear direction and the position of the second striker 5B in the front-rear direction are coincident with each other, the rotation angle $\Theta 1$ of the first hook 6A when the rotation direction of the first hook 6A switches from the reverse direction to the forward direction can be increased. That is, the rotation angle 2 of the second hook 6B when the rotation direction of the first hook 6A switches from the reverse direction to the forward direction can also be increased. As a result, while the cargo bed 2 is transitioning from the lifted state to the lowered state, contact of the second hook 6B with the second striker 5B can be reliably avoided.

In this example, the angle $\alpha$ between the first striker engagement surface 51A and the slide surface 52A is more than 270 degrees and less than 360 degrees. With this configuration, the slide surface 52A can face upward, and therefore, the hook slide surface 64A of the first hook 6A can smoothly contact the slide surface 52A when the cargo bed 2 transitions from the lifted state to the lowered state.

The second striker 5B is in the plate shape expanding in the front-rear direction and the vehicle width direction. With this configuration, the timing of the first hook 6A contacting the first striker 5A can be reliably advanced as compared to the timing of the second hook 6B contacting the second striker 5B.

The second lock 4B does not have the lock spring 7 biasing the second hook 6B about the lock axis C2 in a biasing direction of the second hook 6B being engaged with the second striker 5B. With this configuration, the force of biasing the second hook 6B to the engagement side in the circumferential direction is weakened, and therefore, contact of the second hook 6B with the second striker 5B can be more reliably avoided.

The first striker 5A has the curved surface 53A guiding the first hook 6A to the first striker engagement surface 51A. With this configuration, while the cargo bed 2 is transitioning from the lifted state to the lowered state, the first hook 6A can be smoothly engaged with the first striker 5A without caught by a corner of the first striker 5A. If the first striker 5A does not have the curved surface 53A, the first hook 6A is caught by the corner of the first striker 5A and the first hook 6A cannot be engaged with the first striker 5A in some cases. Since the second hook 6B rotates integrally with the first hook 6A, the second hook 6B cannot be engaged with the second striker 5B. That is, the cargo bed 2 is not sufficiently locked to the base 1 in some cases.

Figure 26:
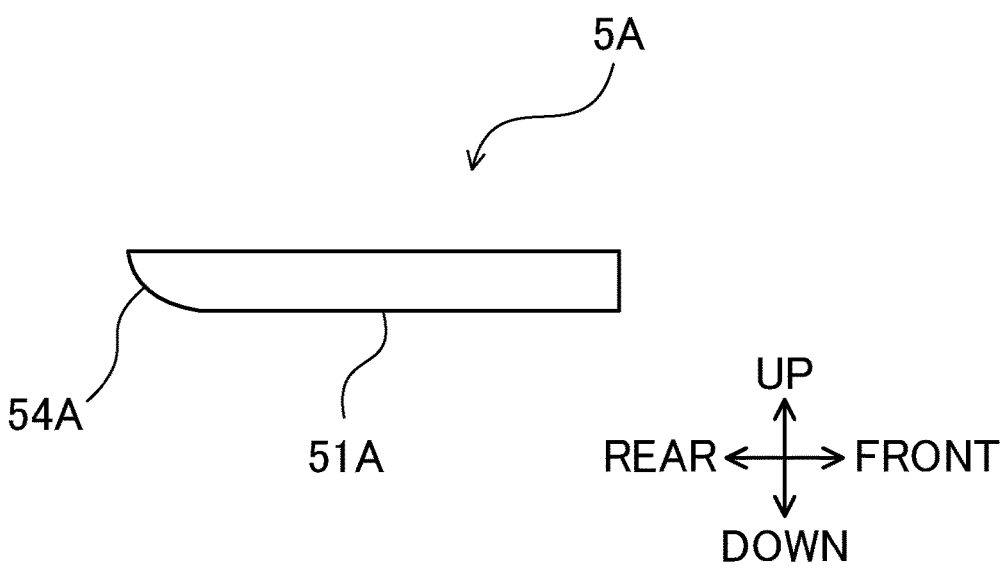
FIG. 26 is a side view of a first striker according to a modification.

Next, a vehicle 200 according to a modification will be described. FIG. 26 is a side view of a first striker 5A of the vehicle 200 according to the modification. The vehicle 200 is different from the vehicle 100 in the shape of the first striker 5A. Other configurations are the same as those of the vehicle 100, and therefore, the same reference numerals as those of the vehicle 100 are used and description thereof will be omitted.

The first striker 5A has the first striker engagement surface 51A which faces downward and with which the bent portion 61A of the first hook 6A contacts from below when the cargo bed 2 is in the lowered state and a curved surface 54A positioned at the edge of the first striker engagement surface 51A and guiding the first hook 6A to the first striker engagement surface 51A. In this example, the first striker 5A is in a plate shape (specifically, flat plate shape) expanding in the front-rear direction and the vehicle width direction. The lower surface of the first striker 5A is the first striker engagement surface 51A. The curved surface 54A is connected to the rear edge of the lower surface of the first striker 5A. The curved surface 54A is curved rearward and upward from the rear edge of the first striker engagement surface 51A.

According to the vehicle 200, since the first striker 5A has the curved surface 54A, the first hook 6A can be smoothly engaged with the first striker 5A without caught by the corner of the first striker 5A while the cargo bed 2 is transitioning from the lifted state to the lowered state. As a result, a probability of the cargo bed 2 being insufficiently locked to the base 1 can be reduced.

OTHER EMBODIMENTS

The embodiment has been described above as an example of the technique disclosed in the present application. However, the technique in the present disclosure is not limited to above, and is also applicable to embodiments to which changes, replacements, additions, omissions, etc. are made as necessary. The components described above in the embodiment may be combined to form a new embodiment. The components shown in the attached drawings and described in detail may include not only components essential for solving the problems, but also components that are provided for describing an example of the above-described technique and are not essential for solving the problems. Thus, description of these non-essential components in detail and illustration of these components in the attached drawings shall not be interpreted that these non-essential components are essential.

For example, the vehicle is not limited to the utility vehicle 100. The vehicle may be, for example, an all terrain vehicle (ATV) or a tractor. Moreover, the vehicle is not limited to the four-wheeled vehicle, and for example, may be a three-wheeled vehicle.

The configuration of the base 1 is not limited. The cargo bed axis C1 may be located in front with respect to the center of the cargo bed 2, and the rear end portion of the cargo bed 2 may be lifted from the base 1. The lift spring 3 is not limited to the gas spring. For example, the lift spring 3 may be merely a coil spring. The lift spring 3 may be located on the left side with respect to the center of the cargo bed 2.

The first striker 5A and the second striker 5B may be attached to the cargo bed 2, and the first hook 6A and the second hook 6B may be attached to the base 1.

The shape of the first striker 5A is not limited to the shape shown in FIG. 8. For example, the shape of the first striker 5A may be a block shape. For example, the angle α between the first striker engagement surface 51A and the slide surface 52A may be more than 180 degrees and 270 degrees or less. For example, the first striker 5A may have only the slide surface 52A, and does not necessarily have the first striker engagement surface 51A and the curved surface 53A. Specifically, the first striker 5A may be in a plate shape expanding in a direction inclined with respect to both the front-rear direction and the up-down direction and the vehicle width direction. The first striker 5A is not necessarily made of the sheet metal. For example, the first striker 5A may be obtained in such a manner that a plate-shaped member having the first striker engagement surface 51A and a plate-shaped member having the slide surface 52A are coupled to each other by, e.g., welding.

The shape of the first hook 6A is not limited to the shape shown in FIG. 6. For example, the shape of the first hook 6A may be a J-shape as viewed from the side.

The shape of the second striker 5B is not limited to the shape shown in FIG. 12. For example, the shape of the second striker 5B may be a block shape.

The shape of the second hook 6B is not limited to the shape shown in FIG. 10. In the above-described example, the shape of the second hook 6B is the same as the shape of the first hook 6A, but may be different from the shape of the first hook 6A. For example, the length of the body 60A of the first hook 6A in the radial direction may be greater than the length of the body 60B of the second hook 6B in the radial direction. With this configuration, when the cargo bed 2 transitions from the lifted state to the lowered state, the timing of the first hook 6A contacting the first striker 5A can be reliably advanced as compared to the timing of the second hook 6B contacting the second striker 5B. Moreover, for example, the maximum width of the bent portion 61A of the first hook 6A in a direction perpendicular to the radial direction may be greater than the maximum width of the bent portion 61B of the second hook 6B in the direction perpendicular to the radial direction. With this configuration, when the cargo bed 2 transitions from the lifted state to the lowered state, the timing of the first hook 6A contacting the first striker 5A can be reliably advanced as compared to the timing of the second hook 6B contacting the second striker 5B.

In a term of a position in the front-rear direction, the position of the first striker 5A may be substantially coincident with the position of the second striker 5B. In this case, in order to achieve the above-described configuration in which the second hook 6B does not contact the second striker 5B when the cargo bed 2 transitions from the lifted state to the lowered state, for example, the shape of the second hook 6B and the shape of the first hook 6A may be different from each other.

The second lock 4B may have the lock spring 7 biasing the second hook 6B about the lock axis C2 in a biasing direction of the second hook 6B being engaged with the second striker 5B.

[Aspects]

The above-described embodiment is a specific example of the following aspects.

(First Aspect) The utility vehicle (vehicle) 100 is the vehicle including the base 1, the cargo bed 2 attached to the base 1 so as to rotate about the predetermined cargo bed axis C1 extending in the vehicle width direction between the lowered state in which the cargo bed 2 is mounted on the base 1 and the lifted state in which the cargo bed 2 is lifted from the base 1, the lift spring 3 biasing the cargo bed 2 from the lowered state to the lifted state, and the lock 4 fixing the cargo bed 2 in the lowered state on the base 1. The lift spring 3 is located offset to the one side with respect to the center of the cargo bed 2 in the vehicle width direction. The lock 4 includes the first lock 4A located offset to the same side as the lift spring 3 with respect to the center of the cargo bed 2 in the vehicle width direction and the second lock 4B located offset to the side opposite to the lift spring 3 with respect to the center of the cargo bed 2 in the vehicle width direction. The first lock 4A has the first striker 5A attached to one of the cargo bed 2 or the base 1, the first hook 6A attached to the other one of the cargo bed 2 or the base 1 so as to rotate about the predetermined lock axis C2 and engaged with the first striker 5A when the cargo bed 2 is in the lowered state, and the lock spring 7 biasing the first hook 6A about the lock axis C2 in a biasing direction of the first hook 6A being engaged with the first striker 5A. The second lock 4B has the second striker 5B attached to the cargo bed 2 or the base 1 to which the first striker 5A is attached, and the second hook 6B attached to the cargo bed 2 or the base 1 to which the first hook 6A is attached so as to rotate about the lock axis C2 and engaged with the second striker 5B when the cargo bed 2 is in the lowered state. The second hook 6B is coupled to the first hook 6A so as to rotate integrally with the first hook 6A. When the cargo bed 2 transitions from the lifted state to the lowered state, the first hook 6A rotates in the reverse direction of the biasing direction against the elastic force of the lock spring 7 by contacting the first striker 5A, and thereafter, rotates in the forward direction which is the biasing direction by the elastic force of the lock spring 7 and is engaged with the first striker 5A; and the second hook 6B rotates without contacting the second striker 5B by rotation of the first hook 6A in the reverse direction, and thereafter, rotates by rotation of the first hook 6A in the forward direction and is engaged with the second striker 5B.

When the cargo bed 2 transitions from the lifted state to the lowered state, the first hook 6A located offset to the same side as the lift spring 3 is positioned higher than the second hook 6B in terms of a position in the up-down direction by biasing of the lift spring 3. Thus, the second hook 6B may start being engaged with the second striker 5B earlier than the timing of engagement of the first hook 6A with the first striker 5A. In this case, there is a probability of the cargo bed 2 being insufficiently locked to the base 1. According to the above-described configuration, the second hook 6B does not contact the second striker 5B while the cargo bed 2 is transitioning from the lifted state to the lowered state. Thus, the above-described insufficient lock state can be avoided, and a probability of the cargo bed 2 being insufficiently locked to the base 1 can be reduced.

(Second Aspect) In the utility vehicle 100 of the first aspect, the second hook 6B does not contact the second striker 5B by rotating by the angle greater than the reference angle θs when the cargo bed 2 transitions from the lifted state to the lowered state, and before the rotation direction of the rotating first hook 6A switches from the reverse direction to the forward direction by contact with the first striker 5A when the cargo bed 2 transitions from the lifted state to the lowered state, the degrees of the rotation angle Θ1 of the first hook 6A are greater than the reference angle θs.

According to this configuration, before the rotation direction of the first hook 6A switches from the reverse direction to the forward direction, the second hook 6B rotating integrally with the first hook 6A can be rotated by the angle greater than the reference angle θs. With this configuration, when the cargo bed 2 transitions from the lifted state to the lowered state, even in a case where the first hook 6A is positioned higher than the second hook 6B in terms of a position in the up-down direction by biasing of the lift spring 3, contact of the second hook 6B with the second striker 5B can be avoided. That is, the above-described configuration in which the second hook 6B does not contact the second striker 5B while the cargo bed 2 is transitioning from the lifted state to the lowered state can be achieved.

(Third Aspect) In the utility vehicle 100 of the first or second aspect, the first hook 6A has the body 60A extending substantially parallel with the radial direction about the lock axis C2 and the bent portion 61A bent from the body 60A, and the first striker 5A has the first striker engagement surface 51A (striker engagement surface) which faces downward and with which the bent portion 61A contacts from below in the lowered state and the slide surface 52A which is located higher than the first striker engagement surface 51A and is inclined with respect to the horizontal plane and on which the bent portion 61A slides when the cargo bed 2 transitions from the lifted state to the lowered state.

According to this configuration, when the cargo bed 2 transitions from the lifted state to the lowered state, the first hook 6A contacts the slide surface 52A of the first striker 5A earlier than the timing of the second hook 6B contacting the second striker 5B and rotates in the reverse direction of the biasing direction against the elastic force of the lock spring 7. The second hook 6B rotates without contacting the second striker 5B by rotation of the first hook 6A in the reverse direction. That is, the above-described configuration in which the second hook 6B does not contact the second striker 5B while the cargo bed 2 is transitioning from the lifted state to the lowered state can be effectively achieved.

(Fourth Aspect) In the utility vehicle 100 of any one of the first to third aspects, the first striker 5A is located offset from the second striker 5B in the direction from the upper end to the lower end of the slide surface 52A in the front-rear direction.

According to this configuration, as compared to the case where the position of the first striker 5A in the front-rear direction and the position of the second striker 5B in the front-rear direction are coincident with each other, the distance in the front-rear direction between the curved surface 53A of the first striker 5A and the lock axis C2 can be increased. Thus, as compared to the case where the position of the first striker 5A in the front-rear direction and the position of the second striker 5B in the front-rear direction are coincident with each other, the rotation angle Θ1 of the first hook 6A when the rotation direction of the first hook 6A switches from the reverse direction to the forward direction can be increased. That is, the rotation angle Θ2 of the second hook 6B when the rotation direction of the first hook 6A switches from the reverse direction to the forward direction can also be increased. As a result, while the cargo bed 2 is transitioning from the lifted state to the lowered state, contact of the second hook 6B with the second striker 5B can be reliably avoided.

(Fifth Aspect) In the utility vehicle 100 of any one of the first to fourth aspects, the second striker 5B is in the plate shape expanding in the front-rear direction and the vehicle width direction.

According to this configuration, the timing of the first hook 6A contacting the first striker 5A can be reliably advanced as compared to the timing of the second hook 6B contacting the second striker 5B.

(Sixth Aspect) In the utility vehicle 100 of any one of the first to fifth aspects, the first hook 6A has the body 60A extending substantially parallel with the radial direction about the lock axis C2 and the bent portion 61A bent from the body 60A, and the first striker 5A has the first striker engagement surface 51A with which the bent portion 61A contacts in the lowered state and the curved surface 53A guiding the first hook 6A to the first striker engagement surface 51A.

Even in a state of the cargo bed 2 being lowered at the maximum, the first hook 6A is caught by the corner of the first striker 5A and cannot be engaged with the first striker 5A in some cases. In this case, the cargo bed 2 is insufficiently locked to the base 1. According to the above-described configuration, the first striker 5A has the curved surface 53A guiding the first hook 6A to the first striker engagement surface 51A. Thus, while the cargo bed 2 is transitioning from the lifted state to the lowered state, the first hook 6A can be smoothly engaged with the first striker 5A without caught by the corner of the first striker 5A. That is, the above-described insufficient lock state can be avoided, and a probability of the cargo bed 2 being insufficiently locked to the base 1 can be reduced.

(Seventh Aspect) In the utility vehicle 100 of any one of the first to sixth aspects, the second lock 4B does not have the lock spring 7 biasing the second hook 6B about the lock axis C2 in a biasing direction of the second hook 6B being engaged with the second striker 5B.

According to this configuration, as compared to a case where the second lock 4B has the lock spring 7, the force of biasing the second hook 6B in a direction of the second hook 6B being engaged with the second striker 5B is weakened, and therefore, contact of the second hook 6B with the second striker 5B can be more reliably avoided.

(Eighth Aspect) In the utility vehicle 100 of any one of the first to seventh aspects, the vehicle is the off-road vehicle.

According to this configuration, in the off-road vehicle, a probability of the cargo bed 2 being insufficiently locked to the base 1 can be reduced.

(Ninth Aspect) The utility vehicle (vehicle) 200 is the vehicle including the base 1, the cargo bed 2 attached to the base 1 so as to rotate about the predetermined cargo bed axis C1 extending in the vehicle width direction between the lowered state in which the cargo bed 2 is mounted on the base 1 and the lifted state in which the cargo bed 2 is lifted from the base 1, the lift spring 3 biasing the cargo bed 2 from the lowered state to the lifted state, and the lock 4 fixing the cargo bed 2 in the lowered state on the base 1. The lift spring 3 is located offset to the one side with respect to the center of the cargo bed 2 in the vehicle width direction. The lock 4 includes the first lock 4A located offset to the same side as the lift spring 3 with respect to the center of the cargo bed 2 in the vehicle width direction and the second lock 4B located offset to the side opposite to the lift spring 3 with respect to the center of the cargo bed 2 in the vehicle width direction. The first lock 4A has the first striker 5A attached to one of the cargo bed 2 or the base 1, the first hook 6A attached to the other one of the cargo bed 2 or the base 1 so as to rotate about the predetermined lock axis C2 and engaged with the first striker 5A when the cargo bed 2 is in the lowered state, and the lock spring 7 biasing the first hook 6A about the lock axis C2 in a biasing direction of the first hook 6A being engaged with the first striker 5A. The second lock 4B has the second striker 5B attached to the cargo bed 2 or the base 1 to which the first striker 5A is attached, and the second hook 6B attached to the cargo bed 2 or the base 1 to which the first hook 6A is attached so as to rotate about the lock axis C2 and engaged with the second striker 5B when the cargo bed 2 is in the lowered state. The second hook 6B is coupled to the first hook 6A so as to rotate integrally with the first hook 6A. The first hook 6A has the body 60A extending substantially parallel with the radial direction about the lock axis C2 and the bent portion 61A bent from the body 60A. The first striker 5A has the first striker engagement surface 51A with which the bent portion 61A contacts in the lowered state and the curved surface 54A guiding the first hook 6A to the first striker engagement surface 51A.

According to this configuration, the first striker 5A has the curved surface 54A, and therefore, the first hook 6A can be smoothly engaged with the first striker 5A without caught by the corner of the first striker 5A while the cargo bed 2 is transitioning from the lifted state to the lowered state. As a result, a probability of the cargo bed 2 being insufficiently locked to the base 1 can be reduced.

(Tenth Aspect) In the utility vehicle 200 of the ninth aspect, the vehicle is the off-road vehicle.

According to this configuration, in the off-road vehicle, a probability of the cargo bed 2 being insufficiently locked to the base 1 can be reduced.

What is claimed:

1. A vehicle comprising:
   a base;
   a cargo bed attached to the base so as to rotate about a predetermined cargo bed axis extending in a vehicle width direction between a lowered state in which the cargo bed is mounted on the base and a lifted state in which the cargo bed is lifted from the base;
   a lift spring biasing the cargo bed from the lowered state to the lifted state; and
   a lock fixing the cargo bed in the lowered state on the base,
   wherein the lift spring is located offset to one side with respect to a center of the cargo bed in the vehicle width direction,
   the lock includes a first lock located offset to a side identical to the lift spring with respect to the center of the cargo bed in the vehicle width direction and a second lock located offset to a side opposite to the lift spring with respect to the center of the cargo bed in the vehicle width direction,
   the first lock has a first striker attached to one of the cargo bed or the base, a first hook attached to the other one of the cargo bed or the base so as to rotate about a predetermined lock axis and engaged with the first striker when the cargo bed is in the lowered state, and a lock spring biasing the first hook about the lock axis in a biasing direction of the first hook being engaged with the first striker,
   the second lock has a second striker attached to the cargo bed or the base to which the first striker is attached, and a second hook attached to the cargo bed or the base to which the first hook is attached so as to rotate about the lock axis and engaged with the second striker when the cargo bed is in the lowered state, the second hook is coupled to the first hook so as to rotate integrally with the first hook, and when the cargo bed transitions from the lifted state to the lowered state, the first hook rotates in a reverse direction of the biasing direction against elastic force of the lock spring by contacting the first striker, and thereafter, rotates in a forward direction which is the biasing direction by the elastic force of the lock spring and is engaged with the first striker, and the second hook rotates without contacting the second striker by rotation of the first hook in the reverse direction, and thereafter, rotates by rotation of the first hook in the forward direction and is engaged with the second striker.

2. The vehicle of claim 1, wherein the second hook does not contact the second striker by rotating by an angle greater than a reference angle when the cargo bed transitions from the lifted state to the lowered state, and before a rotation direction of the rotating first hook switches from the reverse direction to the forward direction by contact with the first striker when the cargo bed transitions from the lifted state to the lowered state, a degree of a rotation angle of the first hook is greater than the reference angle.

3. The vehicle of claim 1, wherein the first hook has a body extending substantially parallel with a radial direction about the lock axis and a bent portion bent from the body, and the first striker has a striker engagement surface which faces downward and with which the bent portion contacts from below in the lowered state, and a slide surface which is located higher than the striker engagement surface and is inclined with respect to a horizontal plane and on which the bent portion slides when the cargo bed transitions from the lifted state to the lowered state.

4. The vehicle of claim 3, wherein the first striker is located offset from the second striker in a direction from an upper end to a lower end of the slide surface in a front-rear direction.

5. The vehicle of claim 1, wherein the second striker is in a plate shape expanding in a front-rear direction and the vehicle width direction.

6. The vehicle of claim 1, wherein the first hook has a body extending substantially parallel with a radial direction about the lock axis and a bent portion bent from the body, and the first striker has a striker engagement surface with which the bent portion contacts in the lowered state and a curved surface guiding the first hook to the striker engagement surface.

7. The vehicle of claim 1, wherein the second lock does not have a lock spring biasing the second hook about the lock axis in a biasing direction of the second hook being engaged with the second striker.

8. The vehicle of claim 1, wherein the vehicle is an off-road vehicle.

9. A vehicle comprising:

a base;

a cargo bed attached to the base so as to rotate about a predetermined cargo bed axis extending in a vehicle width direction between a lowered state in which the cargo bed is mounted on the base and a lifted state in which the cargo bed is lifted from the base;

a lift spring biasing the cargo bed from the lowered state to the lifted state; and a lock fixing the cargo bed in the lowered state on the base, wherein the lift spring is located offset to one side with respect to a center of the cargo bed in the vehicle width direction, the lock includes a first lock located offset to a side identical to the lift spring with respect to the center of the cargo bed in the vehicle width direction and a second lock located offset to a side opposite to the lift spring with respect to the center of the cargo bed in the vehicle width direction, the first lock has a first striker attached to one of the cargo bed or the base, a first hook attached to the other one of the cargo bed or the base so as to rotate about a predetermined lock axis and engaged with the first striker when the cargo bed is in the lowered state, and a lock spring biasing the first hook about the lock axis in a biasing direction of the first hook being engaged with the first striker, the second lock has a second striker attached to the cargo bed or the base to which the first striker is attached, and a second hook attached to the cargo bed or the base to which the first hook is attached so as to rotate about the lock axis and engaged with the second striker when the cargo bed is in the lowered state, the second hook is coupled to the first hook so as to rotate integrally with the first hook, the first hook has a body extending substantially parallel with a radial direction about the lock axis and a bent portion bent from the body, and the first striker has a striker engagement surface with which the bent portion contacts in the lowered state and a curved surface guiding the first hook to the striker engagement surface.

10. The vehicle of claim 9, wherein the vehicle is an off-road vehicle.

* * * * *